(12) United States Patent
Tanimoto et al.

(10) Patent No.: US 11,290,257 B2
(45) Date of Patent: Mar. 29, 2022

(54) DATA TRANSFER SYSTEM AND TRANSFER METHOD

(71) Applicant: RENESAS ELECTRONICS CORPORATION, Tokyo (JP)

(72) Inventors: Tadaaki Tanimoto, Tokyo (JP); Daisuke Moriyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 293 days.

(21) Appl. No.: 16/380,621

(22) Filed: Apr. 10, 2019

(65) Prior Publication Data

US 2019/0342081 A1 Nov. 7, 2019

(30) Foreign Application Priority Data

May 1, 2018 (JP) .............................. JP2018-088104

(51) Int. Cl.
| | |
|---|---|
| *H04L 9/08* | (2006.01) |
| *G06F 21/60* | (2013.01) |
| *H04L 1/00* | (2006.01) |
| *H04L 9/32* | (2006.01) |
| *G06F 7/58* | (2006.01) |

(52) U.S. Cl.
CPC .......... *H04L 9/0819* (2013.01); *G06F 21/602* (2013.01); *H04L 1/0041* (2013.01); *H04L 9/0869* (2013.01); *H04L 9/0894* (2013.01); *H04L 9/3247* (2013.01); *G06F 7/582* (2013.01)

(58) Field of Classification Search
CPC ... H04L 9/0819; H04L 1/0041; H04L 9/0869; H04L 9/0894; H04L 9/3247; H04L 9/0822; H04L 9/0825; H04L 9/0891; H04L 9/085; H04L 9/0877; G06F 21/602; G06F 7/582

See application file for complete search history.

(56) References Cited

U.S. PATENT DOCUMENTS

| | | | |
|---|---|---|---|
| 10,484,184 B2 * | 11/2019 | Oguma ................. | H04L 9/3247 |
| 2011/0022850 A1 * | 1/2011 | Lee ......................... | G06F 21/79 |
| | | | 713/189 |
| 2011/0145601 A1 | 6/2011 | Ihle et al. | |

(Continued)

FOREIGN PATENT DOCUMENTS

| | | |
|---|---|---|
| JP | 2011-004176 A | 1/2011 |
| WO | 2016/095152 A1 | 6/2016 |

OTHER PUBLICATIONS

Extended European Search Report issued in corresponding European Patent Application No. 19167500.8-1218, dated Aug. 1, 2019.

*Primary Examiner* — Christopher A Revak
(74) *Attorney, Agent, or Firm* — McDermott Will & Emery LLP

(57) ABSTRACT

To securely realize updating of a key shared between an apparatus on a transmission side and an apparatus on a reception side. A second apparatus encrypts a new shared key by an encryption processing unit, issues a signature for the encrypted new shared key from a signature processing unit, and transmits the signature and the encrypted new shared key to a first apparatus. When a signature processing unit fails in verifying the signature, the first apparatus performs control to prohibit at least one of processing executed after reception of the encrypted new shared key and required to store the new shared key into a storage unit.

12 Claims, 18 Drawing Sheets

(56) References Cited

U.S. PATENT DOCUMENTS

| | | | |
|---|---|---|---|
| 2015/0172298 A1* | 6/2015 | Otsuka | H04L 63/123 726/30 |
| 2017/0187524 A1 | 6/2017 | Furukawa | |
| 2018/0115558 A1 | 4/2018 | Cotta | |
| 2019/0028448 A1* | 1/2019 | Farrell | H04L 67/12 |
| 2021/0174607 A1* | 6/2021 | Ju | B60S 5/00 |

* cited by examiner

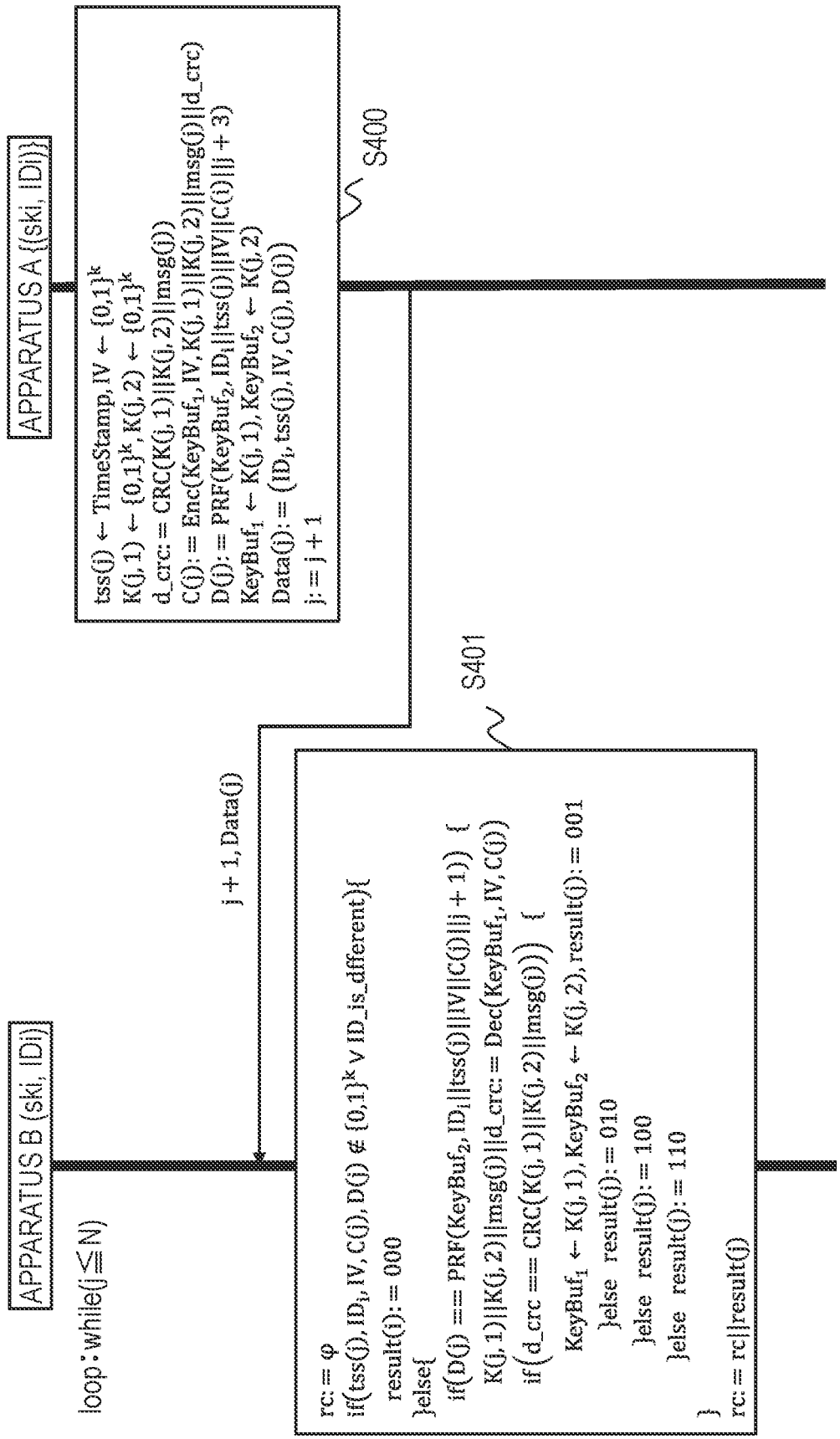

FIG. 9C

APPARATUS B (sk_i, ID_i)      APPARATUS A {(sk_i, ID_i)}

S701

```
rc: = φ, flg: = φ
if(tss(j), ID_i, IV, pre_cnt', C(j), D(j) ∉ {0,1}^k ∨ ID_is_different){
  result(j): = 000
}else{ok_flg(j): = 1, pre_cnt ← CntBufCSRNG − 2
  if(j > 1 ∧ result(j − 1) ≠ 001)  {  if(pre_cnt' == PRF(sk_i, ID_i||tss(j)||pre_cnt||2 × (j + 1))) {
    tmp1 := Enc(KeyBufCSRNG, RandBufCSRNG || pre_cnt), K(j, 1) = tmp1 EOR pre_cnt
    pre_cnt := pre_cnt + 1
    tmp2 := Enc(KeyBufCSRNG, RandBufCSRNG || pre_cnt), K(j, 2) = tmp2 EOR pre_cnt
    }else ok_flg(j): = 0  }
  if(ok_flg(j) == 1) {
    if(D(j) == PRF(KeyBuf_2, ID_i||tss(j)||IV||C(j)||j + 3) {
      K(j, 1)||K(j, 2)||msg(j)||d_crc := Dec(KeyBuf_1, IV, C(j))
      if(d_crc == CRC(K(j, 1)||K(j, 2)||msg(j))) {
        KeyBuf_1 ← K(j, 1), KeyBuf_2 ← K(j, 2), result(j): = 001
      }else result(j): = 010  }else  result(j): = 100  }else  result(j): = 110}
  rc: = rc||result(j), flg: = flg||ok_flg(j)
  if(result(j) ≠ 001){  sk(j) ← {0,1}^k, IV_2 ← {0,1}^k||2 × (j + 1) + 1), sk_crc := CRC(sk(j))
    sr(j) := PRF(sk, ID_i||tss(j)||IV_2||N||2 × (j + 1) + 1)
    c(j) == Enc(sr(j), IV_2, sk(j)||sk_crc)
    c'(j) == PRF(sk_i, IV_2, sk(j)), sk_old: = sk_i, sk_i: = sk(j)
    Data(j + 3): = (ID_i, tss(j), IV_2, c(j), c'(j))  }
```

US 11,290,257 B2

DATA TRANSFER SYSTEM AND TRANSFER METHOD

CROSS-REFERENCE TO RELATED APPLICATIONS

The disclosure of Japanese Patent Application No. 2018-088104 filed on May 1, 2018 including the specification, drawings and abstract is incorporated herein by reference in its entirety.

BACKGROUND

The present invention relates to a data transfer system and a transfer method, and to, for example, a data transfer system and a transfer method which perform the transfer of a shared key.

A technique of securely transferring data between apparatuses has been in demand. For example, Patent Document 1 discloses that a verifying device to verify the security of a protocol of authentication or key exchange determines whether a primitive combination of an encryption method and a sequence satisfies the security of a specified kind.

Further, Patent Document 2 discloses a security device including a microcontroller, a protected memory (memory accessed via an encryption/decryption unit from the microcontroller), and a data encryption/decryption unit. In this device, a main key and a data encryption/decryption key are disposed in the protected memory. Further, the updating of the encryption/decryption key is realized by receiving a key encrypted with the main key by the microcontroller, transferring the same to an encryption unit, decrypting the same with the main key by the encryption unit, and storing the key obtained thereby in a key slot.

RELATED ART DOCUMENTS

Patent Documents

[Patent Document 1] Japanese Unexamined Patent Publication Laid-Open No. 2011-004176
[Patent Document 2] U.S. Unexamined Patent Application Publication No. 2011/0145601, Specification

SUMMARY

There have thus been proposed various techniques for realizing secure communications. However, needs for the secure communications have increasingly been heightened in recent years. A further proposal of a novel technique for realizing the secure communications has been in demand.

Other objects and novel features of the present invention will become apparent from the description of the present specification and the accompanying drawings.

According to one aspect of the present invention, a second apparatus encrypts a new shared key by a second encryption processing unit, issues a signature for the encrypted new shared key from a second signature processing unit, and transmits the signature and the encrypted new shared key to a first apparatus. When a first signature processing unit fails in verifying the signature, the first apparatus performs control to prohibit at least one of processing executed after reception of the encrypted new shared key and required to store the new shared key into a storage unit.

According to the one aspect, it is possible to securely realize updating of a key shared between an apparatus on a transmission side and an apparatus on a reception side.

BRIEF DESCRIPTION OF THE DRAWINGS

FIG. 6A is a diagram showing the flow of a transfer protocol according to a modification of the embodiment 2;
FIG. 9C is a diagram showing the flow of a transfer protocol according to the embodiment 3.

DETAILED DESCRIPTION

Figure 1:
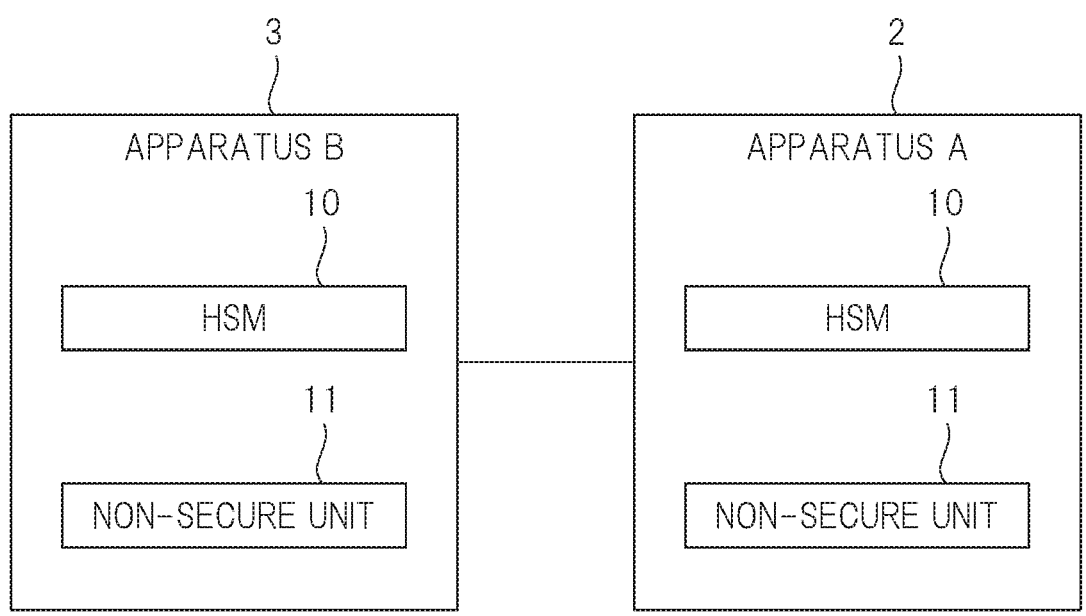
FIG. 1 is a block diagram showing one example of a configuration of a data transfer system according to an embodiment.

For clarity of explanation, the following description and drawings have been appropriately omitted and simplified. Further, the respective processing explained in the following description, and the respective elements shown in the drawings are realized by, for example, a hardware circuit, but some or all thereof may be realized by execution of programs. When realized by the execution of the programs, some or all thereof are realized by executing, for example, a program including one or more instructions stored in a memory provided in an apparatus by a processor included in the apparatus. Incidentally, it will be understood by those skilled in the art that the respective processing explained in the following description, and the respective elements shown in the drawings can be realized in various forms by only hardware, only software or their combination. They are not limited to any of them.

Further, the above-described programs are stored using various types of non-transitory computer readable mediums and can be supplied to a computer. The non-transitory computer readable mediums include various types of substantial recording mediums. Examples of the non-transitory computer readable mediums include a magnetic recording medium (e.g., flexible disk, magnetic tape, hard disk drive), an optical magnetic recording medium (e.g., optical magnetic disk), a CD-ROM (Read Only Memory), a CD-R, a CD-R/W, and a semiconductor memory (e.g., mask ROM, PROM (Programmable ROM), EPROM (Erasable PROM), flash ROM, RAM (Random Access Memory)). Further, the programs may be supplied to the computer by various types of transitory computer readable mediums. Examples of the transitory computer readable mediums include an electric signal, an optical signal, and an electromagnetic wave. The transitory computer readable mediums are capable of supplying programs to the computer through a wired communication path such as an electric wire and an optical fiber or the like, or a wireless communication path.

Summaries of Embodiments

The summaries of embodiments will be described before the details of the embodiments are described.

A gadget for easily collecting each packet flowing on an on-vehicle network has recently been provided at low cost. Therefore, when a shared key leaks due to some factors, there is concern about an attack by falsified packet re-transmission, and there is concern about a higher-level attack or the like by the analysis of each collected packet. In order to cope with it, it is desirable to use a data transfer protocol having forward secrecy realizable only by a shared key. Further, since a packet data error due to noise or the like, and a packet loss due to a failure in apparatus can occur in the on-vehicle network, there is a demand for coping with these. In particular, efficient generation and updating of a session key are necessary in realizing the data transfer having the forward secrecy.

In an embodiment 1, when there is a possibility that a key received as a new shared key is falsified in an apparatus on a reception side, an apparatus to prevent the key from being registered is configured.

Further, in an embodiment 2, an initial session key setting using a pre-shared key is executed by an apparatus on a transmission side and at least one or more apparatuses on a reception side. Thereafter, a session key sequence using pseudo random numbers is prepared by the apparatus on the transmission side and stored in at least one or more alternation buffers unreadable from a non-secure unit such as a CPU (Central Processing Unit). Then, an i+1th key is encrypted according to an encryption system with authentication with an ith key and transmitted to the apparatus on the reception side. The apparatus on the reception side securely executes signature verification and decryption of data while decrypting a key received in an i+1th number using a key received in an ith number and storing the same in a region unaccessible from the non-secure unit such as the CPU or the like. Consequently, a data transmission/reception protocol capable of multicast having forward secrecy is realized. Here, a 0th key becomes an initial session key. Further, when the encryption system with the authentication is replaced with encryption and signature issuance for an encryption result, it includes at least two alternation buffers being an alternation buffer storing an encryption/decryption key and an alternation buffer storing a signature issuance/verification key.

Coping with the packet loss is predicated on a configuration in which after the transfer of one or more packets, Ack is returned from the apparatus on the reception side to the apparatus on the transmission side. In the apparatus on the transmission side, a key value stored in a packet where Ack is assumed to be returned is separately stored in a region unaccessible from the non-secure unit such as the CPU or the like. At the stage where Ack is returned, a pre-shared key is updated to the stored key value. In the apparatus on the reception side, the pre-shared key is updated to the latest key value at the return of Ack.

When re-transmission from the packet where the packet loss has occurred is made, the latest session key at which updating for its transaction can be executed is identified by the apparatus on the reception side, and an encryption result of the session key, with authentication by a pre-shared key is transmitted to the apparatus on the transmission side, whereby re-synchronization of the session key is executed on both sides of the apparatus on the transmission side/the apparatus on the reception side where consistency lacks due to the packet loss. Then, the apparatus on the transmission side performs re-transmission from the packet in which the packet loss has occurred. This is repeated until all transfers are completed, each time a new packet loss is generated. Here, the updating of the pre-shared key is executed with the re-transmission as a timing. When a malfunction occurs due to these re-transmission, all transmission and reception are executed again from the setting of the initial session key.

Embodiments 3 and 4 also handle the case where when a packet loss is generated, re-transmission from a packet where the packet loss is generated is not performed. As such a configuration, there is concretely shown a configuration in which a pseudo random number to be generated is changed to a cryptographical pseudo random number (CSRNG) generated based on an input random number, a counter value, and a key for pseudo random number generation. That is, CSRNG is capable of generating by inputting a counter value, a key value corresponding to the counter value. In order to cope with the case where the packet loss has occurred, in each packet, a signature based on a pre-shared key is added to one preceding counter value, and the verification of the signature is executed in the apparatus on the reception side. When the signature is successful, a key value is generated with CSRNG by using one preceding counter. Thus, it is possible to acquire a key necessary for signature verification and decryption of the present packet dat. Here, the initial setting for generating the cryptographical pseudo random number is executed by a security protocol having secrecy and falsification resistance using the pre-shared key. When it is determined that a re-transmission request for a loss is not necessary, the apparatus on the reception side returns Ack when a predetermined counter value is updated. When a re-transmission request from the apparatus on the reception side is made, the apparatus on the transmission side restores the counter value to the counter value used upon transmission of a packet to be re-transmitted and then performs re-transmission. Upon the re-transmission request, authentication using the pre-shared key may be executed. In particular, the updating of the pre-shared key is executed with the re-transmission as a timing. Further, when a malfunction occurs due to these re-transmission, all transmission and reception are executed again from the setting of an initial session key.

Incidentally, since message transmission and reception between the apparatuses is performed by, for example, wired transmission, a message error and loss can occur, but the exchange of order of messages is assumed not to occur.

Embodiment 1

FIG. 1 is a block diagram illustrating one example of a configuration of a data transfer system 1 according to an embodiment. The data transfer system 1 is, for example, an on-vehicle network system applied to a vehicle such as an automobile, and has an apparatus A2 and an apparatus B3.

The apparatus A2 is, for example, a gateway which receives a signal from the outside of the vehicle. The apparatus B3 is, for example, an MCU (Micro Control Unit; Microcontroller) which controls respective components (brake, motor, engine, steering, etc.) of the vehicle. In the present embodiment, the apparatus A2 and the apparatus B3 are coupled to be communicable with each other through wire, but may be coupled to be communicable with each other through radio.

The apparatus A2 and the apparatus B3 respectively have an HSM (Hardware Security Module) 10 and a non-secure unit 11. The HSM 10 is a hardware which performs various processing including the management of a key in order to securely realize communications between the apparatuses. Further, the non-secure unit 11 is a component other than the HSM 10 in each of the apparatuses A2 and B3 and includes, for example, a processor like a CPU (Central Processing Unit), a transmission/reception circuit, etc.

Figure 2:
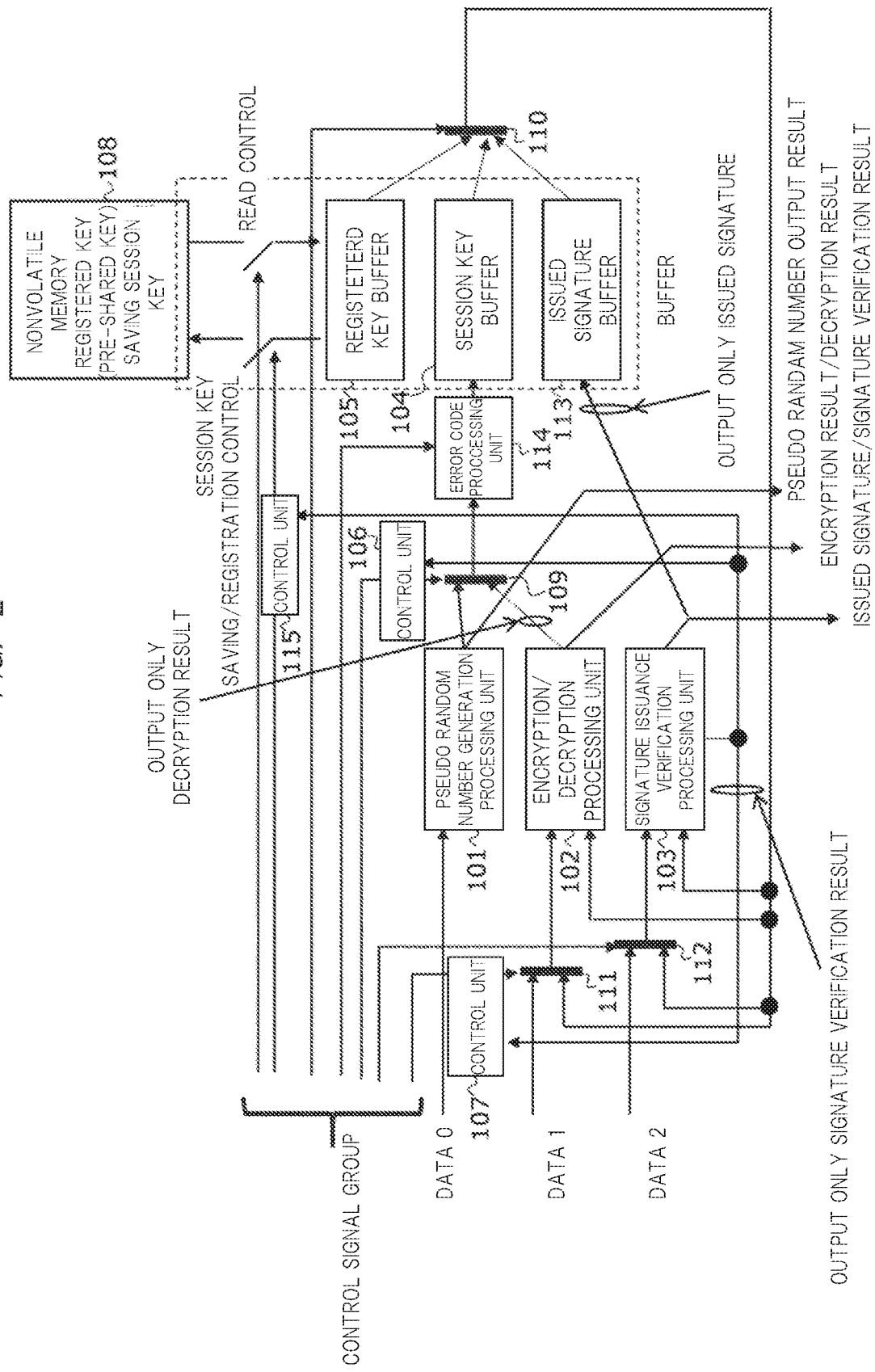
FIG. 2 is a block diagram showing one example of a configuration of an HSM according to an embodiment 1.

FIG. 2 is a block diagram showing one example of a configuration of the HSM 10 according to the embodiment 1. A description will be made as to a hardware configuration of performing encryption/decryption processing, signature issuance verification processing, and key storage by using FIG. 2. As illustrated in FIG. 2, the HSM 10 has a pseudo random number generation processing unit 101, an encryption/decryption processing unit 102, a signature issuance verification processing unit 103, a session key buffer 104, a registered key buffer 105, an issued signature buffer 113, an error code processing unit 114, a nonvolatile memory 108, control units 106, 107, and 115, and selectors 109, 110, 111, and 112. Here, the pseudo random number generation processing unit 101 may be provided with a genuine random number generating function.

The pseudo random number generation processing unit 101 generates a pseudo random number. The pseudo random number generated in the pseudo random number generation processing unit 101 is used for a session key, an IV (Initial Vector) used in block encryption, signature issuance processing, etc. Further, in response to the input of data input as data 0, the pseudo random number generation processing unit 101 performs concatenation with the generated pseudo random number and transfers the result of its concatenation to the error code processing unit 114. The error code processing unit 114 adds an error code like, for example, a CRC (Cyclic Redundancy Check) value thereto. Incidentally, when there is no data input, the pseudo random number generation processing unit 101 transfers the generated pseudo random number to the error code processing unit 114. Thus, the error code is added to the generated pseudo random number in the error code processing unit 114. The error code processing unit 114 performs processing to generate an error code such as a CRC or an ECC (Error Correction Code), and error detecting processing based on the error code. A result of processing by the error code processing unit 114 can be stored in the session key buffer 104.

The encryption/decryption processing unit 102 performs encryption/decryption processing intended for input data or the key by using a key registered in the registered key buffer 105 or the session key buffer 104, or the issued signature buffer 113. An object to be encrypted/decrypted is data input as data 1. A key value stored in the session key buffer 104 becomes an object intended for the encryption processing. Which one should be taken as the input data is controlled by the selector 111. Here, which one of the keys stored in the buffer is used is selected by using the selector 110. Further, a result of decryption by the decryption processing with the buffer-stored value as the input is not allowed to be output to the outside or the like.

Using the key registered in the registered key buffer 105 or the session key buffer 104, the signature issuance verification processing unit 103 performs signature issuance verification processing intended for input data or the key. Further, the signature issuance verification processing unit 103 stores each issued signature in the issued signature buffer 113. Which one should be taken as input data is controlled by the selector 112. Here, whether to use either the key of the registered key buffer 105 or the key of the session key buffer 104 as the key used in the signature issuance verification is assumed to be selected by using the selector 110.

The session key buffer 104 is a buffer memory which stores either an output value of the pseudo random number generation processing unit 101 or an output value of the result of decryption by the encryption/decryption processing unit 102. This selection is performed by the selector 109. The reading of data from the session key buffer 104 can be performed by reading by the encryption/decryption processing unit 102 or the signature issuance verification processing unit 103, or only the storage transfer of data to the nonvolatile memory 108. With a view toward definitely distinguishing the keys for each use purpose, the reading from the session key buffer 104 may be limited only to the use as the key in the signature issuance verification processing unit 103 and the storage transfer of the data to the nonvolatile memory 108.

Further, the HSM 10 has at lease one of the control unit 106, the control unit 107, and the control unit 115.

The control unit 106 controls storage into the session key buffer 104. When the HSM 10 is configured to have the control unit 106, the storage of the value of the result of decryption by the encryption/decryption processing unit 102 into the session key buffer 104 is controlled by the control unit 106 so as to be allowed only where it passes signature verification carried out by the signature issuance verification processing unit 103 prior to the storage. That is, in case of a failure in the signature verification, writing into the session key buffer 104 is prohibited by the control unit 106.

The control unit 107 controls the execution of decryption processing by the encryption/decryption processing unit 102. When the HSM 10 is configured to have the control unit 107, the input of data to be decrypted to the encryption/decryption processing unit 102 is controlled by the control unit 107 to be done only when passing the signature verification by the signature issuance verification processing unit 103. That is, in case of a failure in the signature verification, the processing of decryption by the encryption/decryption processing unit 102 is prohibited.

The control unit 115 controls storage into the nonvolatile memory 108. When the HSM 10 is configured to have the control unit 115, the storage (key registration) of the stored value of the session key buffer 104 into the nonvolatile memory 108 is controlled by the control unit 115 so as to be done only when passing the signature verification by the signature issuance verification processing unit 103. That is, in case of a failure in the signature verification, writing of the stored value of the session key buffer 104 into the nonvolatile memory 108 is prohibited.

Particularly, for example, the keys stored in the registered key buffer 105 and the session key buffer 104 may all be used only for the signature issuance verification. Further, by storing the generated signature in the issued signature buffer 113 and operating the same as an encryption/decryption key, the key used in the encryption/decryption and the key used in the signature issuance verification may be set to be used only for either one thereof with the keys defined to be elements with respect to each other. By means of this control and the key storage control by the control unit 106, 107 or 115, upon decrypting encrypted data, the key registration of a decryption result into the nonvolatile memory 108 is performed where signature verification done before its decryption, relative to the encrypted data is successful. The safety and consistency of the data are therefore guaranteed.

The issued signature buffer 113 is a buffer memory which stores the signature issued from the signature issuance verification processing unit 103. The reading of data from the present buffer is possible only from the encryption/decryption processing unit 102 and the signature issuance verification processing unit 103. With a view toward definitely distinguishing the keys for each use purpose, the reading from the issued signature buffer 113 may be limited only to the use as the encryption/decryption key of the encryption/description processing unit 102.

The nonvolatile memory 108 is a nonvolatile memory in which key registration is performed, and is capable of only transmission and reception of data to and from the session key buffer 104, the registered key buffer 105, and the issued signature buffer 113. For example, the key registration to the registered key buffer 105 is carried out by writing key data from the session key buffer 104 to the nonvolatile memory 108 and reading the same to the registered key buffer 105.

The registered key buffer 105 is a buffer memory settable only from the nonvolatile memory 108. The registered key buffer 105 may include addresses to enable a plurality of keys to be registered therein. When there is an address, the reading of data from the present buffer, which is accompanied with addressing can be performed only by reading from the encryption/description processing unit 102 and the signature issuance verification processing unit 103 or the data storage transfer to the nonvolatile memory 108. With a view toward definitely distinguishing the keys for each use purpose, the reading from the registered key buffer 105 may be limited only to the use as the key of the signature issuance verification processing unit 103 and the data storage transfer to the nonvolatile memory 108.

In the above configuration, there is given a control signal group including control signals to the control units 106, 107, and 115, control signals to the selectors 110, 111, and 112, a control signal for the key registration and saving control from each of the session key buffer 104 and the registered key buffer 105 to the nonvolatile memory 108, and a control signal for key reading control from the nonvolatile memory 108 to the registered key buffer 105. This control signal group may be configured as an output of exclusive control hardware having a register which accepts a command or may be configured as an output from a processing unit which can be executed and controlled by a program. The former configuration is assumed to be accompanied with a program executable controller. Further, both configurations are also assumed to be accompanied with a memory which stores the output results (issued signature, signature verification result, encryption result, decryption result, and pseudo random number output) shown in FIG. 2. The processing unit capable of execution and control by the program and the program executable controller are assumed to be capable of reading into the memory. Therefore, the non-secure unit 11 is capable of using the transfer data stored in the memory through the HSM 10. However, the decryption result is controlled so that the value of the key stored in the buffer is not output to the memory storing the output results.

Incidentally, in respective sequences of the apparatus A2 and the apparatus B3 to be described with reference to the drawings, processing is executed below under the control of the above-mentioned exclusive control hardware or processing unit incorporated in the HSM 10, for example.

Figure 3:
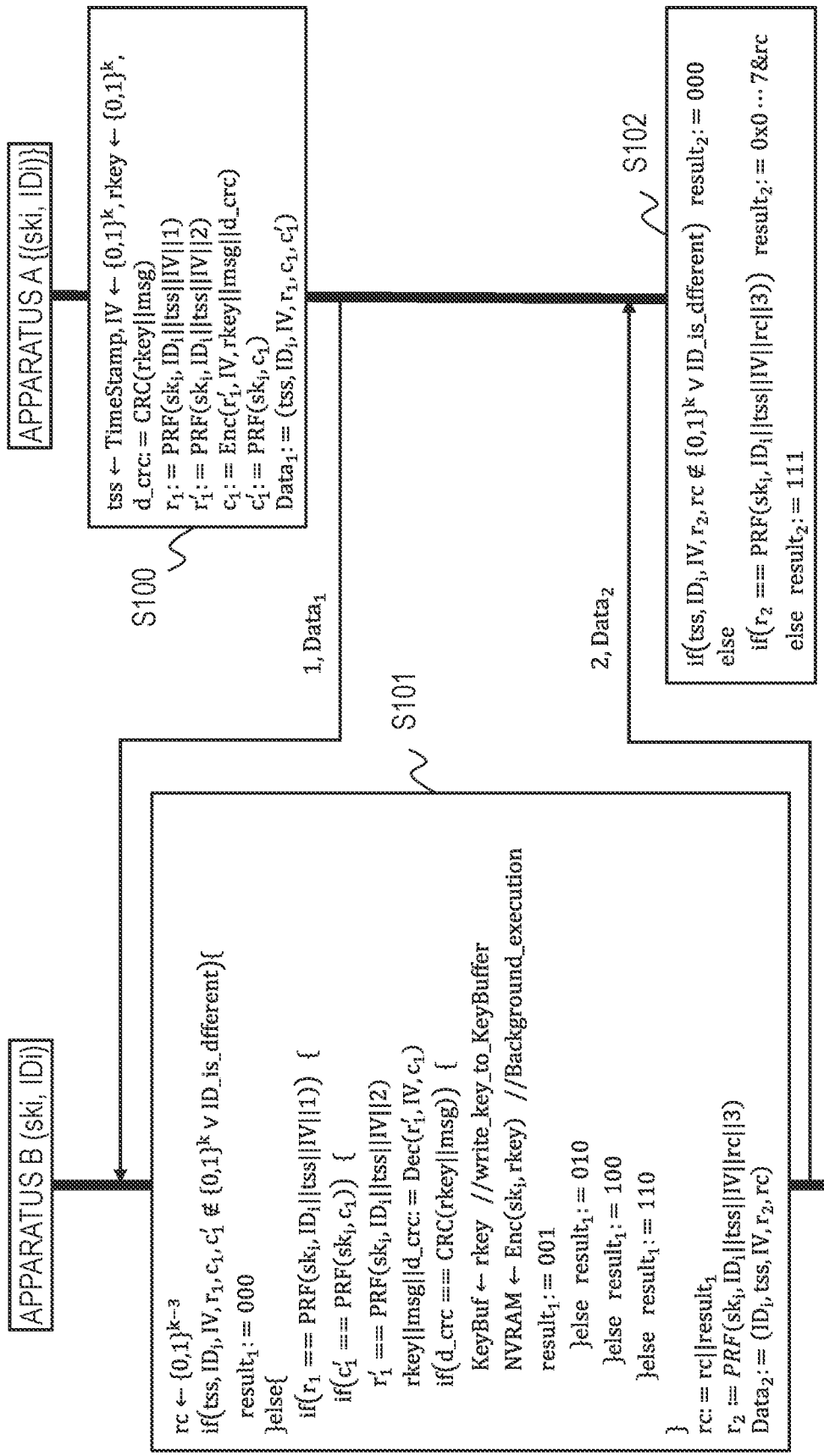
FIG. 3 is a diagram showing the flow of a transfer protocol according to the embodiment 1.

Next, the operation of an apparatus-to-apparatus key/message transmission reception protocol considering functional safety having falsification resistance and secrecy is shown below by using the sequence of FIG. 3. When a message is not involved, a shared symmetric key setting protocol is provided which sets a shared symmetric key generated in the apparatus A2 to the apparatus B3. Here, the consideration of the functional safety is indicative of a correspondence to a data error in a communication path and a data error at a hardware failure. Incidentally, the following settings are assumed to have been done in advance as initial settings of the shared symmetric key to the apparatus A2 and the apparatus B3.

The apparatus A2 inputs $1\^k$ with a security parameter as k. The apparatus A2 selects a symmetric key $ski \leftarrow \{0,1\}\^k$ (i.e., a bit length of ski is k) with respect to the apparatus B3 to which an authentication identifier $IDi \in \{0,1\}\^k$ is assigned, and transmits (ski,IDi) thereto. Here, ski is a key used as a pre-shared key. The apparatus B3 stores (ski,IDi) in the nonvolatile memory 108. Further, the apparatus B3 transmits a set ID of authentication identifiers IDi to the apparatus A2. Here, the total number of apparatuses B3 is assumed to be M, and $i \in [1,M]$. For example, these processing are executed before shipment of the apparatuses B3, whereby each individual key may be set to each apparatus B3 and stored in the apparatus A2. Further, the non-secure unit 11 of the apparatus B3 is assumed to be capable of reading IDi stored in the HSM 10 of the apparatus B3. However, changing by overwriting and deletion are assumed not to be capable of execution by proper access control.

(1) Construction of Apparatus Authentication Information in Apparatus A2:

The apparatus A2 executes the following (S100):

1. selects the present time as tss←TimeStamp.

2. generates random numbers in the pseudo random number generation processing unit 101 and assumes the same to be $IV \leftarrow \{0,1\}\^k$ and $rkey \leftarrow \{0,16\}\^k$. Here, IV is an initial vector used in block encryption. Further, rkey is a new pre-shaped key to be shared with the apparatus B3.

3. continues processing in the pseudo random number generation processing unit 101 and concatenates rkey and transmission data msg.

Further, the apparatus A2 calculates a CRC or an ECC in the error code processing unit 114. For example, a CRC is assumed to have been calculated, and is defined as d_crc: =CRC (rkey∥msg) and stored in the session key buffer 104. An operator '∥' indicates bit concatenation.

4. calculates r1:=PRF(ski, IDi∥tss∥IV∥1) in the signature issuance verification processing unit 103 and outputs a calculation result. On the other hand, the apparatus A2 calculates r1':=PRF (ski,IDi∥tss∥IV∥2) in the signature issuance verification processing unit 103 and stores the same in the issued signature buffer 113. Here, PRF is a pseudo random function. Further, r1 is used as a signature, and r1' is used as a key for encryption/decryption processing.

Next, the apparatus A2 reads rkey∥msg∥d_crc from the session key buffer 104 and reads r1' from the issued signature buffer 113. The apparatus A2 calculates c1:=Enc(r1', IV, rkey ∥msg∥d_crc) in the encryption/decryption processing unit 102 and outputs a calculation result, and on the other hand, executes c1':=PRF(ski,c1) in the signature issuance verification processing unit 103. Here, Enc is a shared key block encryption, e.g., AES-CBC. Further, c1 is encrypted data of data including a new key, and c1' is its signature.

5. summaries the calculation results obtained in the above into Data1:=(tss,IDi,IV,r1,c1,c1') and transmits (1, Data1) to the apparatus B3.

Thus, the apparatus A2 encrypts a new shared key by means of the encryption/decryption processing unit 102, issues a signature for the encrypted new shared key from the signature issuance verification processing unit 103, and transmits the signature and the encrypted new shared key to the apparatus B3.

(2) Data Decryption and Data Storage in Apparatus B3:

The apparatus B3 executes the following (S101):

1. generates a random number $rc \leftarrow \{0,1\}^{(k-3)}$ in the pseudo random number generation processing unit 101 and executes random number output.

2. verifies whether tss,IDi,IV,r1,c1,c1' $\in \{0,1\}^k$, i.e., the lengths of their respective data are respectively defined as a predetermined value, and IDi coincides with its own one. Consequently, simple screening is performed. When the result of verification is not satisfied, result1:=000, and the apparatus B3 shifts processing to the following Step 7. When the verification result is satisfied, the following operations are executed.

3. verifies in the signature issuance verification processing unit 103 whether r1=PRF(ski, IDi tss||IV||1) is satisfied. When the result of its verification is not satisfied, result1:=110. When the verification result is satisfied, the following processing are executed.

4. verifies in the signature issuance verification processing unit 103 whether c1'=PRF(ski,c1) is satisfied. When the result of verification is not satisfied, result1:=100. Incidentally, when the HSM 10 is configured to have the control unit 107, decryption processing is possible only when it is satisfied. When c1'=PRF(ski,c1) is satisfied, and the decryption processing is possible, the apparatus B3 calculates r1':=PRF(ski, IDi||tss||IV||2) again in the signature issuance verification processing unit 103 and stores a calculated value in the issued signature buffer 113. Then, this is used as a key for the encryption/decryption processing unit 102 to thereby execute rkey||msg||d_crc:=Dec (r1', IV, c1) and execute the following Step 5 and subsequently. Here, Dec is decryption for the shared-key block encryption, e.g., decryption for AES-CBC. That is, when the HSM 10 is configured to have the control unit 107, decryption processing is performed on c1 readable into the encryption/decryption processing unit 102 by the control of the control unit 107. Further, when the HSM 10 is configured to have the control unit 106, the result of decryption is passed to the error code processing unit 114 only when c1'=PRF(ski,c1) is satisfied (i.e., when result1≠100), where the following Step 5 and subsequently are executed. When, however, it is not satisfied (i.e., when result1==100), the processing is shifted to the following Step 7.

5. calculates CRC of rkey||msg obtained by decryption as CRC (rkey||msg) in the error code processing unit 114 and verifies whether it coincides with d_crc. When it does not coincide with d_crc, result1:=010. When they are coincident with each other, the following operations are executed.

6. writes rkey into the session key buffer 104 and executes the transfer of rkey from the session key buffer 104 to the nonvolatile memory 108 by background processing. At this time, since the signature verification is successful in the above Step 4 when the HSM 10 is provided with the control unit 106 or the control unit 107, a series of processing becomes possible. Thus, when the HSM 10 does not have the control unit 115, it is possible to write rkey into the nonvolatile memory 108. Further, only when the signature verification in the above Step 4 is successful where the HSM 10 has the control unit 115, writing into the nonvolatile memory 108 is allowed by the control unit 115, so that the writing of rkey into the nonvolatile memory 108 is enabled. Thus, when the signature verification is failed, the control units 106, 107, and 115 perform control of prohibiting at least one of processing executed after the reception of the encrypted new shared key and required to store the new shared key into the nonvolatile memory 108. Incidentally, the writing into the nonvolatile memory 108 may be defined as the writing of the result of calculation of Enc. ECB(sk0, rkey) by using the secrete key sk0 inherent to each apparatus. Further, result1:=001

7. calculates rc:=rc||result1 and r2:=PRF (ski, IDi||tss-s||IV||rc||3) in the signature issuance verification processing unit 103. Here, r2 is a signature concerting data to be transmitted from the apparatus B3 to the apparatus A2.

8. summaries the calculation results obtained in the above into Data2:=(IDi,tss,IV,r2,rc) and transmits (2,Data2) to the apparatus A2.

(3) Verification of Authentication Result in Apparatus A2:

The apparatus A2 executes the following (S102).

Upon receipt of (2, Data232 (IDi, tss, IV, r2, rc)), the apparatus A2 verifies whether or not IDi, tss, IV, r2, rc $\in \{0, 1\}^k$, i.e., the lengths of their respective data are respectively defined as a predetermined value, and verifies whether IDi is an ID registered as an ID of the apparatus B3. When the results of verification are not satisfied, result2:=000. When the verification results are satisfied, the signature issuance verification processing unit 103 included in the apparatus A2 verifies whether r2=PRF (ski, IDi||tss||IV||rc||3). When the result of verification is correct, it is defined to be low-order 3 bits of result2:=rc. When it is not correct, result2:=111. Then, result2 is output as an authentication result and recorded. Here, when result2 is 001, its processing is recorded assuming that the key rkey and the data msg are not falsified and leaked, and the data is prevented from lacking, and further, rkey is successfully stored in a key storage region of the apparatus B3. Further, when result2 is 010, 100, and 110, they are respectively recorded as a write failure due to data lacking at writing, a failure in signature verification processing before the data decryption, and a reception error (possibility of message falsification).

The present protocol is fail safe because when any of IV, c1, c1', and r1 is falsified, the verification of the signature in the apparatus B3 issued from the apparatus A2 is failed. Further, the signature r2 is issued in the apparatus B3, and hence it is not possible for an attacker to make verification in the apparatus A2 successful with the falsification of the value of rc. When all or any of IV, c1, c1', r1, and rc is falsified, it is possible to detect the occurrence of some falsification.

The data transfer system 1 according to the embodiment 1 has been described above. The above-mentioned data transfer system 1 can also be represented as follows: The data transfer system 1 includes the apparatus A2 having the encryption/decryption processing unit 102 and the signature issuance verification processing unit 103, and the apparatus B3 having the encryption/decryption processing unit 102, the signature issuance verification processing unit 103, and the storage unit (session key buffer 104 and nonvolatile memory 108) to store the shared key decrypted by the encryption/decryption processing unit 102. Here, the apparatus A2 encrypts the new shared key by the encryption/decryption processing unit 102, issues the signature for the encrypted new shared key from the signature issuance verification processing unit 103, and transmits the signature and the encrypted new shared key to the apparatus B3. Further, when the signature issuance verification processing unit 103 fails in verifying the signature, the apparatus B3 performs control to prohibit at least one of the processing executed after the reception of the encrypted new shared key and required to store the new shared key into the storage unit of the apparatus B3. Specifically, for example, the apparatus B3 causes the control unit 107 to perform control to prohibit decryption of the encrypted new shared key by the encryption/decryption processing unit 102. Also, for example, the apparatus B3 causes the control unit 106 to perform control to prohibit storage of the new shared key decrypted by the encryption/decryption processing unit 102 into the buffer memory (session key buffer 104 being the buffer memory temporarily storing the shared key stored in the nonvolatile memory 108). Further, for example, the apparatus B3 causes the control unit 115 to perform control to prohibit storage of the new shared key decrypted by the encryption/decryption processing unit 102 and stored in the buffer memory (session key buffer 104) into the nonvolatile memory 108.

Thus, unless the signature verification to the encryption data to be decrypted is passed upon the decryption processing, it becomes impossible to execute the decryption processing or it becomes possible to execute the decryption processing but impossible to write the result of decryption into the buffer, or it is also possible to write the result of decryption processing into the buffer but impossible to write a plaintext written into the buffer into the nonvolatile memory 108. That is, since the data transfer system is provided with the hardware control which makes it possible to execute these only when the signature verification is acceptable, it has the immunity against the chosen-plaintext attack and the chosen-encrypted text attach upon usage of the plaintext of the decryption result from the encrypted text through its memory storage.

Further, as described above, the apparatus A2 has an error code processing unit 219 which generates an error detection code or an error correction code relative to data to be transferred. The apparatus B3 has an error code processing unit 219 which detects an error by using the error detection code or the error correction code relative to the data transferred from the apparatus A2. Therefore, even if a data error occurs, it is possible to appropriately cope with it.

Embodiment 2

Figure 4:
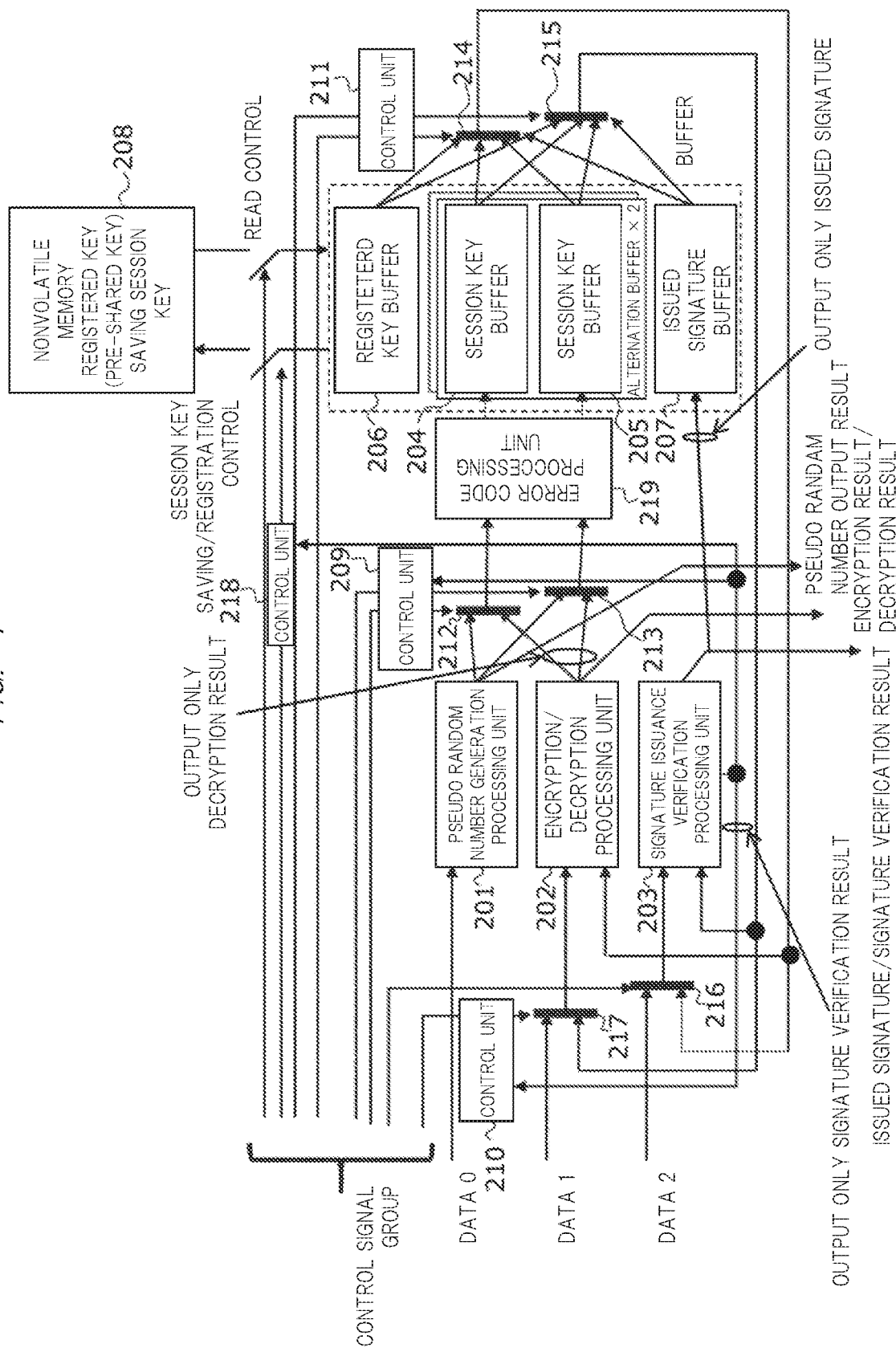
FIG. 4 is a block diagram showing one example of a configuration of an HSM according to an embodiment 2.

An embodiment 2 will next be described. The embodiment 2 is different from the embodiment 1 in that it is provided with alternation buffers. FIG. 4 is a block diagram showing one example of a configuration of an HSM 10 according to the embodiment 2. Using FIG. 4, description will be made below as to a hardware configuration of performing encryption/decryption processing, signature issuance verification processing, and key storage, which generates an update key by using a session key stored in the corresponding alternation buffer. As shown in FIG. 4, the HSM 10 of the embodiment 2 has a pseudo random number generation processing unit 201, an encryption/decryption processing unit 202, a signature issuance verification processing unit 203, session key buffers 204 and 205, a registered key buffer 206, an issued signature buffer 207, an error code processing unit 219, a nonvolatile memory 208, control units 209, 210, 211, and 218, and selectors 212, 213, 214, 215, 216, and 217.

The pseudo random number generation processing unit 201 generates a pseudo random number. The pseudo random number generated in the pseudo random number generation processing unit 201 is used for a session key, an IV (Initial Vector) used in block encryption, signature issuance processing, etc. Further, in response to the input of data input as data 0, the pseudo random number generation processing unit 201 performs concatenation with the generated pseudo random number and transfers the result of its concatenation to the error code processing unit 219. The error code processing unit 219 adds an error code like, for example, a CRC value thereto. Incidentally, when there is no data input, the pseudo random number generation processing unit 201 transfers the generated pseudo random number to the error code processing unit 219. Thus, the error code is added to the generated pseudo random number in the error code processing unit 219. The error code processing unit 219 performs processing to generate an error code such as a CRC or an ECC, and error detecting processing based on the error code. A result of processing by the error code processing unit 219 can be stored in the session key buffer 204 or the session key buffer 205. To which one the processing result is stored is selected by the control of the control unit 209.

Using a key registered in the registered key buffer 206, the session key buffer 204 or the session key buffer 205, or the issued signature buffer 207, the encryption/decryption processing unit 202 performs encryption/decryption processing intended for input data or the key. One to be encrypted/decrypted is data input as data 1, and a key value stored in the session key buffer 204 or the session key buffer 205 becomes an object for encryption processing. Which one thereof is taken as the input data is controlled by the selector 217. Here, which key stored in the buffer should be used is assumed to be selected using the selector 215. Further, the output of a decryption result by decryption processing with the buffer-stored value as the input to the outside or the like is made impossible.

Using the key registered in the registered key buffer 206, the session key buffer 204 or the session key buffer 205, or the issued signature buffer 207, the signature issuance verification processing unit 203 performs signature issuance verification processing intended for input data or the key. Further, the signature issuance verification processing unit 203 stores an issued signature in the issued signature buffer 207. Which one is taken as the input data is controlled by the selector 216. Here, which key is used as the key used for signature issuance verification is assumed to be selected using the selector 214.

The session key buffer 204 and the session key buffer 205 are both session-key alternation buffers. That is, the session key buffer 204 and the session key buffer 205 are respectively provided with a plurality of surfaces. Specifically, the session key buffer 204 has a first surface (hereinafter assumed to be denoted at reference numeral 204-1), and a second surface (hereinafter assumed to be denoted at reference numeral 204-2). Likewise, the session key buffer 205 has a first surface (hereinafter assumed to be denoted at reference numeral 205-1), and a second surface (hereinafter assumed to be denoted at reference numeral 205-2). The session key buffer 204 and the session key buffer 205 are buffer memories which respectively store either an output value of the pseudo random number generation processing unit 201 or an output value of a result of decryption by the encryption/decryption processing unit 202. This selection is executed by the selector 212 and the selector 213. The reading of data from the session key buffer 204 and the session key buffer 205 can be executed by only reading by the encryption/decryption processing unit 202 or the signature issuance verification processing unit 203, or the data storage transfer to the nonvolatile memory 208. With a view toward definitely distinguishing the keys for each use purpose, the reading may be limited only to the use as the key of the signature issuance verification processing unit 203 and the data storage transfer to the nonvolatile memory 208.

Further, the HSM 10 has at least one of the control unit 209, the control unit 210, and the control unit 218 which perform the following control.

The control unit 209 controls the storage into the session key buffers 204 and 205. When the HSM 10 is configured to have the control unit 209, the storage of a decryption result value of the encryption/decryption processing unit 202 into the session key buffers 204 and 205 is controlled by the control unit 209 so as to be allowed only when the signature verification executed in the signature issuance verification processing unit 203 before its storage is passed. That is, when the signature verification is failed, writing into the session key buffers 204 and 205 is prohibited by the control unit 209.

The control unit 210 controls execution of the decryption processing by the encryption/decryption processing unit 202. When the HSM 10 is configured to have the control unit 210, the input of data to be decrypted to the encryption/decryption processing unit 202 is controlled by the control unit 210 to be performed only when the signature verification in the signature issuance verification processing unit 203 is passed. That is, when the signature verification is failed, the decryption processing by the encryption/decryption processing unit 202 is prohibited.

The control unit 218 controls storage into the nonvolatile memory 208. When the HSM 10 is configured to have the control unit 218, the storage (key registration) of the stored values of the session key buffers 204 and 205 into the nonvolatile memory is controlled by the control unit 218 to be performed only when the signature verification in the signature issuance verification processing unit 203 is passed. That is, when the signature verification is failed, writing of the stored values of the session key buffers 204 and 205 into the nonvolatile memory 208 is prohibited.

Particularly, for example, the keys stored in the registered key buffer 206 and the session key buffers 204 and 205 may all be used only for the signature issuance verification. Further, by storing the generated signature in the issued signature buffer 207 and operating the same as an encryption/decryption key, the key used in the encryption/decryption and the key used in the signature issuance verification may be set to be used only for either one thereof with the keys defined to be elements with respect to each other. Also, one additional alternation buffer is provided to store the output of the signature issuance verification processing unit 203, and this is operated as an encryption/decryption key, whereby the keys stored in the registered key buffer 206 and the session key buffers 204 and 205 may all be used only for the signature issuance verification. By means of this control and the key storage control by the control unit 209, 210 or 218, upon decrypting encrypted data, the key registration of a decryption result into the nonvolatile memory 208 is performed where signature verification done before its decryption, relative to the encrypted data is successful. The safety and consistency of the data are therefore guaranteed.

The control unit 211 controls the operations of the selectors 214 and 215.

The issued signature buffer 207 is a buffer memory which stores a signature issued by the signature issuance verification processing unit 203. The reading of data from the present buffer is possible only from the encryption/decryption processing unit 202 and the signature issuance verification processing unit 203. With a view toward definitely distinguishing the keys for each use purpose, the reading from the issued signature buffer 207 may be limited only to the use as the encryption/decryption key of the encryption/decryption processing unit 202.

The nonvolatile memory 208 is a nonvolatile memory capable of key registration and is capable of only transmission and reception of data to and from the session key buffers 204 and 205, the registered key buffer 206, and the issued signature buffer 207. For example, the key registration to the registered key buffer 206 is performed by writing key data from the session key buffers 204 and 205 to the nonvolatile memory 208 and reading the same to the registered key buffer 206.

The registered key buffer 206 is a buffer memory settable only from the nonvolatile memory 208. The registered key buffer 206 may be provided with addresses to enable a plurality of keys to be registered therein. When there is an address, the reading of data from the present buffer, which is accompanied with addressing can be performed only by reading from the encryption/description processing unit 202 and the signature issuance verification processing unit 203 or the data storage transfer to the nonvolatile memory 208. With a view toward definitely distinguishing the keys for each use purpose, the reading from the registered key buffer 206 may be limited only to the use as the key of the signature issuance verification processing unit 203 and the data storage transfer to the nonvolatile memory 208.

In the above configuration, there is given a control signal group including control signals to the control units 209, 210, 211, and 218, control signals to the selectors 212, 213, 214, 215, 216, and 217, a control signal for the key registration and saving control from each of the session key buffer 204 and 205 and the registered key buffer 206 to the nonvolatile memory 208, and a control signal for key reading control from the nonvolatile memory 208 to the registered key buffer 206. This control signal group may be configured as an output of exclusive control hardware having a register which accepts a command or may be configured as an output from a processing unit which is capable of execution control by a program. The former configuration is assumed to be accompanied with a program executable controller. Further, both configurations are also assumed to be accompanied with a memory which stores the output results. The processing unit capable of execution control by the program and the program executable controller are assumed to be capable of reading and writing from and into the memory. Therefore, the non-secure unit 11 is capable of using the transfer data stored in the memory through the HSM 10. Further, the updating of a key value accompanied with a backup copy of the key value to the nonvolatile memory 208 can be appropriately executed. Particularly, the updating of the key value is preferably executed as an object for the key value after being registered in the nonvolatile memory 208. This is for preventing the key value from disappearing due to power interruption.

Operations concerning the embodiment 2 will next be described. When transfers are continuously performed N times (where N is an integer of 2 or more) from an apparatus A2 to an apparatus B3, the sequence shown in FIG. 3 is repeated. In the repetitive operation of the sequence shown in FIG. 3, key generation, key encryption and its signature generation are carried out sequentially upon each transfer. By using the session key alternation buffer configuration shown in FIG. 4, the key generation/encryption/signature issuance can be executed at high speed with a stronger configuration in which access from other than the encryption/decryption processing unit 202, the signature issuance verification processing unit 203, and the nonvolatile memory 208 does not exist physically. This will be shown by sequence diagrams of FIGS. 5A and 5B. That is, the operation of an apparatus-to-apparatus key/message transmission reception protocol considering functional safety having falsification resistance and secrecy is shown below using FIGS. 5A and 5B. When a message is not involved, a shared symmetric key setting protocol is provided which sets a shared symmetric key generated in the apparatus A2 to the apparatus B3.

In the present embodiment, in order to show the sequence based on the configuration of separating and executing the encryption/decryption processing and the signature issuance verification processing, the session key alternation buffers are respectively assumed to be provided with an encryption/decryption processing key and a signature issuance verification key as two sets in total. That is, the session key buffer 204 is a buffer for storing the encryption/description key and has a first surface (referred in the following description as 204-1), and a second surface (referred in the following description as 204-2). Further, the session key buffer 205 is a buffer for storing the signature issuance verification key and has a first surface (referred in the following description as 205-1), and a second surface (referred in the following description as 205-2).

When an encryption system with authentication is used instead without separating the encryption/decryption processing and the signature issuance verification processing, one session key alternation buffer may be provided. Further, when encryption/decryption processing is set as encryption/decryption processing in an encryption system with authentication, and signature issuance verification processing is executed by the encryption/decryption processing in the encryption system with the authentication, there is obtained a configuration in which the encryption system with the authentication is used. That is, the contents of the present disclosure include message reception and transmission in the encryption system with the authentication.

Incidentally, as initial settings of the shared symmetric key to the apparatus A2 and the apparatus B3, settings similar to the initial settings mentioned in the description of the embodiment 1 are assumed to have been done in advance.

Incidentally, sequences to be shown below are sequences where transfers are continuously performed N times (where N is an integer of 2 or more) on the apparatus A2 and the apparatus B3. Also, each transfer is done accompanied with updating of a shared key. Further, the control by the control units 209, 210, and 218 is carried out as with the control units 106, 107, and 115 in the embodiment 1 although description thereof is appropriately omitted in the sequences to be shown below.

Figure 5A:
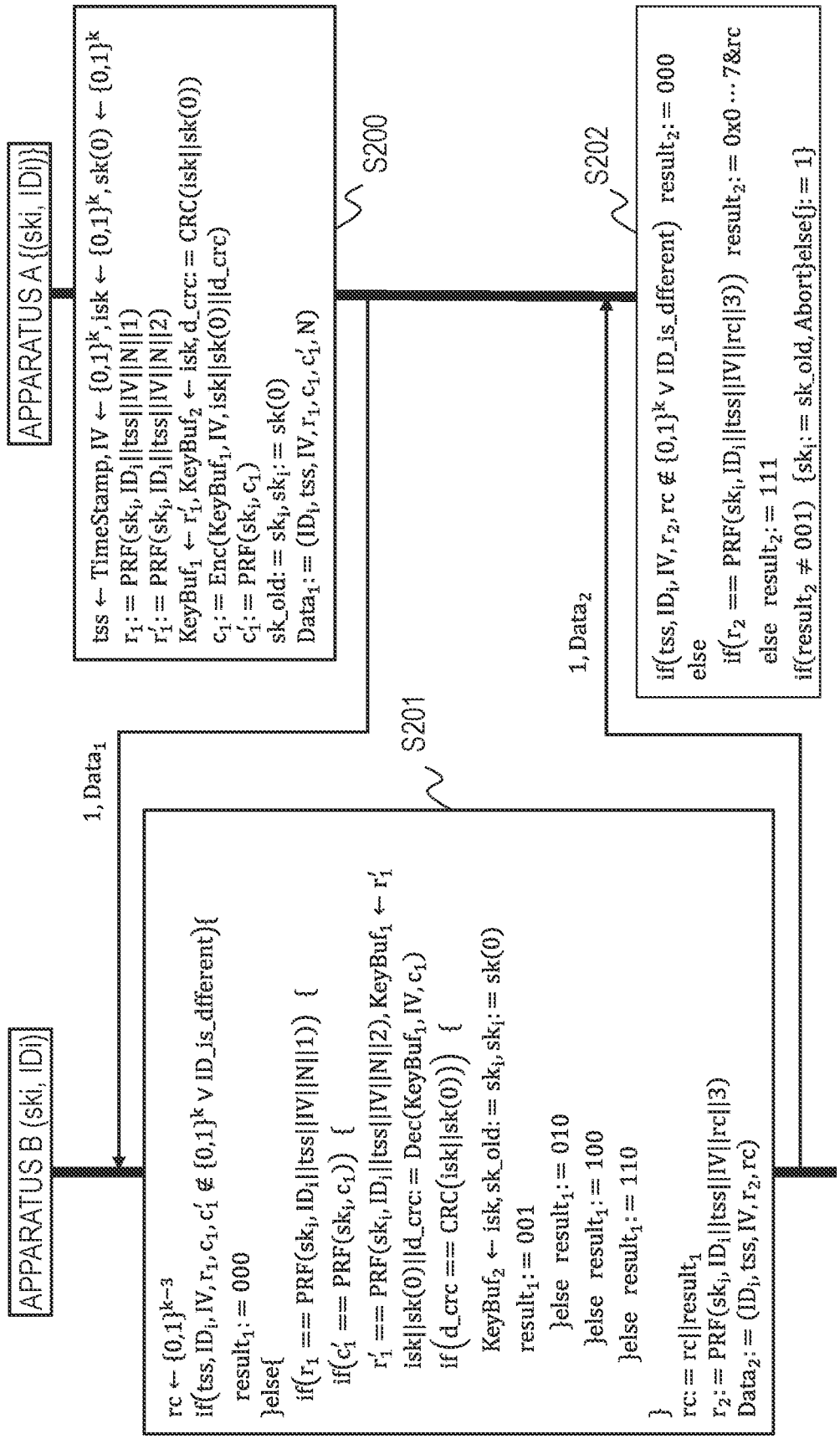
FIG. 5A is a diagram showing the flow of a transfer protocol according to the embodiment 2.

<(1) Mutual Authentication Accompanied with Notification of Number of Times of Transfers>(refer to FIG. 5A)

(1-1) Construction of Apparatus Authentication Information in Apparatus A2:

The apparatus A2 executes the following (S200):

1. selects the present time as tss←TimeStamp.

2. generates random numbers in the pseudo random number generation processing unit 201 and assumes the same to be IV←$\{0,1\}^k$, isk←$\{0,1\}^k$, and sk(0)←$\{0,1\}^k$. Here, IV is an initial vector used in block encryption. Further, isk is a key for signature issuance. sk(0) is a new pre-shaped key to be shared with the apparatus B3.

3. calculates r1:=PRF (ski, IDi∥tss∥IV∥N∥1) in the signature issuance verification processing unit 203 and outputs a calculation result. On the other hand, the apparatus A2 calculates r1':=PRF(ski,IDi∥tss∥IV∥N∥2) in the signature issuance verification processing unit 203. r1 is used as a signature, and r1' is used as a key for encryption/decryption processing.

4. stores r1' into the session key buffer KeyBuf1 (204-1) and stores isk into the session key buffer KeyBuf2(205-1).

5. continues processing in the pseudo random number generation processing unit 201 and concatenates isk and sk(0). Further, the apparatus A2 calculates a CRC or an ECC in the error code processing unit 219. For example, the CRC is assumed to have been calculated, and is defined as d_crc:=CRC (isk∥sk(0)), followed by being stored in the session key buffer 204-2. Sk(0) is stored in the additional session key buffer 205-2.

6. reads a key from the session key buffer KeyBuf1(204-1), calculates c1:=Enc(r1',IV, isk∥sk(0)∥d_crc) in the encryption/decryption processing unit 202 and outputs a calculation result. On the other hand, the apparatus A2 executes c1':=PRF (ski, c1) in the signature issuance verification processing unit 203. C1 is encrypted data of data including a new key, and c1' is its signature.

7. In preparation for the updating of the pre-shared key ski already registered in the nonvolatile memory 208, sk_old:=ski, and ski:=sk(0) are executed in the buffer. Here, sk_old registration and ski updating may be executed in the nonvolatile memory 208.

8. summaries the calculation results obtained in the above into Data1:=(IDi,tss,IV,r1,c1,c1',N) and transmits (1, Data1) to the apparatus B3.

(1-2) Data Decryption and Data Storage in Apparatus B3:

The apparatus B3 executes the following (S201):

1. generates a random number rc←$\{0,1\}^{(k-3)}$ in the pseudo random number generation processing unit 201 and executes random number output.

2. verifies whether tss,IDi,IV,r1,c1,c1'∈$\{0,1\}^k$, i.e., the lengths of their respective data are respectively defined as a predetermined value, and determines whether IDi coincides with its own one. When they are not satisfied, result1:=000, and the apparatus B3 shifts processing to the following Step 7. When they are satisfied, the following operations are executed.

3. verifies in the signature issuance verification processing unit 203 whether r1=PRF(ski, IDi tss∥IV∥N∥1) is satisfied. When the result of its verification is not satisfied, result1:=110. When the verification result is satisfied, N is identified as the number of times of transmission, and the following processing are executed.

4. verifies in the signature issuance verification processing unit 203 whether c1'=PRF(ski,c1) is satisfied. When the result of its verification is not satisfied, result1:=100. Since decryption processing is enabled when the verification result is satisfied, the apparatus B3 calculates r1':=PRF(ski, IDi∥tss∥IV∥N∥2) in the signature issuance verification processing unit 203 and stores its calculated value in the issued signature buffer 207, followed by being stored in the session key buffer KeyBuf1 (204-1) within the buffer. The apparatus B3 uses this as a key of the encryption/decryption processing unit 202 and executes isk∥sk (0)∥d_crc:=Dec (r1',IV, c1), and executes the following Step 5 and subsequently. Here, Dec is decryption at shared key block encryption, e.g., decryption at AES-CBC, for example.

5. calculates a CRC of isk∥sk (0) obtained by decryption as CRC (isk∥sk (0)) in the error code processing unit 219 and verifies whether it coincides with d_crc. When they do not coincide with each other, result1:=010. When the result of its verification is satisfied, the following operations are executed.

6. writes isk into the session key storage buffer KeyBuf2 (205-1) and stores sk (0) into an additional session key buffer 205-2. In preparation for the updating of the pre-shared key ski already registered in the nonvolatile memory 208, the apparatus B3 executes sk_old:=ski, and ski:=sk (0) within the buffer. The apparatus B3 executes key registration of isk and sk_old and ski updating with background processing in the nonvolatile memory 208. At this time, since the signature verification is in success in the above Step 4, writing into the nonvolatile memory 208 is possible. This writing may also be defined as writing of an encryption result like Enc .ECB (sk0, isk), using a secrete key sk0 inherent to each apparatus. Further, result1:=001.

7. calculates rc:=rc||result1, and r2:=PRF(ski, IDi||tss||IV||rc||3) in the signature issuance verification processing unit 203. Here, r2 is a signature for data to be transmitted from the apparatus B3 to the apparatus A2.

8. summaries the calculation results obtained in the above into Data2:=(IDi,tss,IV,r2,rc) and transmits (2, Data2) to the apparatus A2.

(1-3) Verification of Authentication Result in Apparatus A2:

The apparatus A2 executes the following (S202).

Upon receipt of (2, Data2 =(IDi, tss, IV, r2, rc)), the apparatus A2 verifies whether or not IDi, tss, IV, r2, rc∈{0, 1}^k, i.e., the lengths of their respective data are respectively defined as a predetermined value, and verifies whether IDi is an ID registered as an ID of the apparatus B3. When the results of verification are not satisfied, result2:=000. When the verification results are satisfied, the signature issuance verification processing unit 203 included in the apparatus A2 verifies whether r2=PRF (ski, IDi||tss||IV||rc||3). When the result of verification is correct, it is defined to be low-order 3 bits of result2:=rc. When it is not correct, result2:=111. Then, result2 is output as an authentication result and recorded. Here, when result2 is 001, the key updating of the pre-shared key, which is executed within the buffer is reflected on the nonvolatile memory 208 by the background processing. When already reflected thereon, this processing is not necessary. Further, an index variable j for repetitive processing is set to 1. On the other hand, when result2 is not 001, the key updating is cancelled, and ski:=sk_old is executed within the buffer. When the key updating has already been reflected on the nonvolatile memory 208, the key updating is cancelled in the nonvolatile memory 208. Further, at this time, the apparatus A2 interrupts the processing and notifies the interrupted processing to the apparatus B3. This interruption notification is done in mutual authentication using ski prior to the updating. In particular, in the mutual authentication based on the present interruption notification, the apparatus B3 executes signature verification using ski and sk_old and executes the identification of the pre-shared key. When sk_old is identified as the pre-shared key, ski:=sk_old is executed as cancel processing and reflected on the nonvolatile memory 208 of the apparatus B3. The apparatus B3 issues a signature by using the identified pre-shared key and notifies the same to the apparatus A2. The apparatus A2 executes signature verification using ski before being updated. When this is passed, the identification of the pre-shared key between the apparatus A2 and the apparatus B3 is completed. When the identification of the pre-shared key is successful, the present protocol can be executed again from the beginning. With the completion of the interruption processing, the execution of the present protocol is interrupted.

Now, when result2 is 001 in the apparatus A2, its processing is recorded assuming that the key isk and sk(0) are not falsified by a man in the middle and leaked thereto, and are prevented from lacking, and further, isk and sk(0) are successfully stored in a key storage region of the apparatus B3. Further, when result2 is 010, its processing is recorded as a write failure due to value lacking at writing. When result2 is 100, its processing is recorded as a failure in signature verification processing before the data decryption. When result2 is 110, its processing is recorded as a reception error (possibility of message falsification) .

The present protocol is fail safe because when any of IV, c1, c1', and r1 is falsified, the verification of the signature in the apparatus B3 issued from the apparatus A2 is failed. Further, the signature r2 is issued in the apparatus B3, and hence it is not possible for an attacker to make verification in the apparatus A2 successful with the falsification of the value of rc. When all or any of IV, c1, c1', r1, and rc is falsified, it is possible to detect the occurrence of some falsification.

After the completion of the sequence of the above (1), N times transfers are performed in the following manner.

Figure 5B:
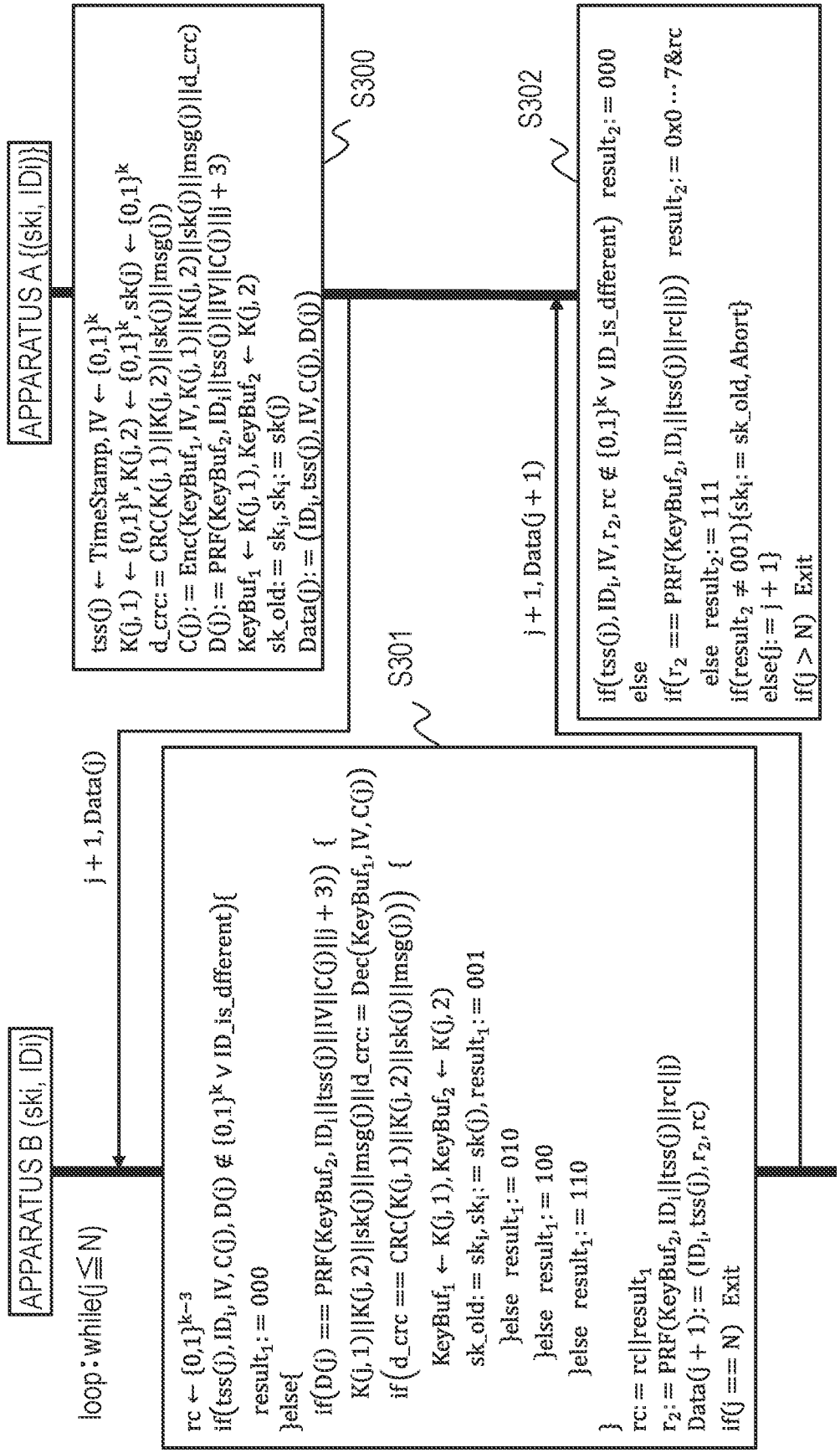
FIG. 5B is a diagram showing the flow of a transfer protocol according to the embodiment 2.

<(2) Key Updating Accompanied with Mutual Authentication and Transfer of Plural Times>(refer to FIG. 5B)

(2-1) Construction of Apparatus Authentication Information in Apparatus A2:

The apparatus A2 executes the following (S300):

1. selects the present time as tss (j)←TimeStamp.

2. generates random numbers in the pseudo random number generation processing unit 201 and assumes the same to be IV←{0,1}^k, K(j,1)←{0,1}^k, K(j,2)←{0,1}^k, and sk(j)←{0,1}^k. K(j,1) is stored in the session key buffer 204-2, and K (j,2) is stored in the buffer 205-2. Here, K (j,1) is a new key used in encryption/decryption processing upon the next transfer. Also, K(j,2) is a new key used in signature issuance verification processing upon the next transfer. Further, sk(j) is a new pre-shaped key.

3. continues processing in the pseudo random number generation processing unit 201 and concatenates K(j,1), K(j,2), and sk(j) and a transmission message msg(j) if it exists. Further, the apparatus A2 calculates a CRC or an ECC in the error code processing unit 219. For example, the CRC is assumed to have been calculated, and is defined as d_crc:=CRC (K(j,1)||K(j,2)||sk(j)||msg(j)), followed by being stored in the buffer. Sk(j) is stored in the additional buffer.

4. reads a key value from the session key buffer KeyBuf1 (204-1), calculates C(j):=Enc(KeyBuf1, K(j,1)||K(j,2)||sk(j)||msg(j)||d_crc) in the encryption/decryption processing unit 202 and outputs a calculation result. On the other hand, the apparatus A2 reads a key value from the session key buffer KeyBuf2(205-1), calculates D(j):=PRF(KeyBuf2, IDi||tss(j)||IV||C(j)||j+3) in the signature issuance verification processing unit 203 and outputs a calculation result.

5. flips the two session key alternation buffers. That is, the buffer 204-2 is replaced with KeyBuf1(204-1), and the buffer 204-1 is replaced with the buffer 204-2. Likewise, the buffer 205-2 is replaced with KeyBuf2(205-1), and the buffer 205-1 is replaced with 205-2.

6. In preparation for the updating of the pre-shared key ski already registered in the nonvolatile memory 208, sk_old:=ski, and ski:=sk(j) are executed in the buffer. Here, sk_old registration and ski updating may be executed in the nonvolatile memory 208.

7. summaries the calculation results obtained in the above into Data (j+1):=(IDi,tss(j),IV,C(j),D(j)) and transmits (j+1, Data (j+1)) to the apparatus B3.

(2-2) Data Decryption and Data Storage in Apparatus B3:

The apparatus B3 executes the following (S301):

1. generates a random number rc←{0,1}^(k-3) in the pseudo random number generation processing unit 201 and executes random number output.

2. verifies whether tss (j), IDi, IV, C(j),D(j) ∈{0,1}^k, i.e., the lengths of their respective data are respectively defined as a predetermined value, and determines whether IDi coincides with its own one. When they are not satisfied, result1:=000, and the apparatus B3 shifts processing to the following Step 7. When they are satisfied, the following operations are executed.

3. reads a key value from the session key buffer KeyBuf2 (205-1), and verifies in the signature issuance verification processing unit 203 whether D(j)=PRF (KeyBuf2, IDi∥tss (j)∥IV∥N∥j+3) is satisfied. When the result of its verification is not satisfied, result1:=110. When the verification result is satisfied, the following processing are executed.

4. reads a key value from the session key buffer KeyBuf1 (204-1). The apparatus B3 executes K (j,1)∥K (j,2)∥sk (j)∥msg(j)∥d_crc:=Dec (KeyBuf1, IV, C(j)) in the encryption/decryption processing unit 202, and executes the following Step 5 and subsequently.

5. calculates a CRC of K (j,1)∥K (j,2)∥sk (j)∥msg(j) obtained by decryption, as CRC (K (j,1)∥K (j,2)∥sk (j)∥msg (j)) in the error code processing unit 219 and verifies whether it coincides with d_crc. When they are not coincident with each other, result1:=010. When the verification result is satisfied, the following operations are executed.

6. stores K (j,1) obtained as a decryption result in the session key buffer 204-2 and stores K (j,2) in the buffer 205-2. The apparatus B3 flips the two session key alternation buffers. That is, the buffer 204-2 is replaced with KeyBuf1 (204-1), and the buffer 204-1 is replaced with the buffer 204-2. Likewise, the buffer 205-2 is replaced with KeyBuf2 (205-1), and the buffer 205-1 is replaced with the buffer 205-2. In preparation for the updating of the pre-shared key ski already registered in the nonvolatile memory 208, sk_old:=ski, and ski:=sk (j) are executed in the buffer. Here, sk_old registration and ski updating are executed in the nonvolatile memory 208. Further, result1:=001.

7. calculates rc:=rc∥result1, and r2: PRF (ski, IDi∥tss (j)∥rc∥j) in the signature issuance verification processing unit 203.

8. summaries the calculation results obtained in the above into Data(j+1):=(IDi,tss(j),r2,rc) and transmits (j+1, Data(j+1)) to the apparatus A2. Further, when j=N is satisfied, the apparatus B3 finishes the processing. When it is not satisfied, the apparatus B3 enters a data reception waiting from the apparatus A2 and continues the repetitive processing. However, when the apparatus B3 receives a processing interruption notification from the apparatus A2, the apparatus B3 executes interruption processing to be described in the following (2-3).

(2-3) Verification of Authentication Result in Apparatus A2:

The apparatus A2 executes the following (S302).

Upon receipt of (j+1,Data(j+1))=(IDi,tss(j),r2,rc)), the apparatus A2 verifies whether or not IDi,tss(j),r2,rc∈{0,1}^k, i.e., the lengths of their respective data are respectively defined as a predetermined value, and verifies whether IDi is an ID registered as an ID of the apparatus B3. When the results of verification are not satisfied, result2:=000. When the verification results are satisfied, the apparatus A2 reads a key value from the session key buffer KeyBuf2(205-1) and verifies in the signature issuance verification processing unit 203 included in the apparats A2 whether r2=PRF(ski,IDi∥tss (j)∥rc∥j). When the verification result is correct, it is defined to be low-order 3 bits of result2:=rc. When it is not correct, result2:=111. Then, result2 is output as an authentication result and recorded. Here, when result2 is 001, the key updating of the pre-shared key, which is executed within the buffer is reflected on the nonvolatile memory 208 by the background processing. When already reflected thereon, this processing is not necessary. Further, an index variable j for repetitive processing is incremented. It is determined whether j>N is established. When it is established, the N times transfers are completed and the apparatus A2 finishes the processing. When it is not established, the apparatus A2 continues the repetitive processing. On the other hand, when result2 is not 001, the key updating is cancelled, and ski:=sk_old is executed within the buffer. When the key updating has already been reflected on the nonvolatile memory 208, the key updating is cancelled in the nonvolatile memory 208. Further, at this time, the apparatus A2 interrupts the processing and notifies the processing interruption to the apparatus B3. This interruption notification is done in mutual authentication using ski prior to the updating. In particular, in the mutual authentication based on the present interruption notification, the apparatus B3 executes signature verification using ski and sk_old and executes the identification of the pre-shared key. When sk_old is identified as the pre-shared key, ski:=sk_old is executed as cancel processing and reflected on the nonvolatile memory 208 of the apparatus B3. The apparatus B3 issues a signature by using the identified pre-shared key and notifies the same to the apparatus A2. The apparatus A2 executes signature verification using ski before being updated. When this is passed, the identification of the pre-shared key between the apparatus A2 and the apparatus B3 is completed. When the identification of the pre-shared key is successful, the present protocol can be executed again from the beginning. With the completion of the interruption processing, the execution of the present protocol is interrupted.

Now, when result2 is 001 in the apparatus A2, its processing is recorded assuming that the key K (j,1), K (j,2) and sk (j) are not falsified by a man in the middle and leaked thereto, and are prevented from lacking, and further, K (j,1), K(j,2) and sk (j) are successfully stored in a key storage region of the apparatus B3. Further, when result2 is 010, its processing is recorded as a write failure due to value lacking at writing. When result2 is 100, its processing is recorded as a failure in signature verification processing before the data decryption. When result2 is 110, its processing is recorded as a reception error (possibility of message falsification).

The present protocol is fail safe because when any of IV, C(j), and D(j) is falsified, the verification of the signature in the apparatus B3 issued from the apparatus A2 is failed. Further, the signature r2 is issued in the apparatus B3, and hence it is not possible for an attacker to make verification in the apparatus A2 successful with the falsification of the value of rc. When all or any of IV, C(j), and D(j) is falsified, it is possible to detect the occurrence of some falsification.

In the data transfer system 1 according to the embodiment 2 described above, the apparatus A2 and the apparatus B3 respectively have the buffer memories (session key buffers 204 and 205) each temporarily storing the shared key. The buffer memories are respectively provided with the first surfaces (204-1 an 205-1) and the second surfaces (204-2 and 205-2). Further, the shared key used for this time transfer is stored in one surface, and the new shared key used for the next transfer is stored in the other surface. According to such a configuration, it is possible to execute the processing at high speed when the N times transfers are carried out. This is because the storage and reading of the key into and from the nonvolatile memory 208 can be omitted by switching of the alternation buffers for each transfer. Incidentally, it is needless to say that the storage of the key into the nonvolatile memory 208 may be performed to cope with the power interruption.

Modification of Embodiment 2

Figure 6B:
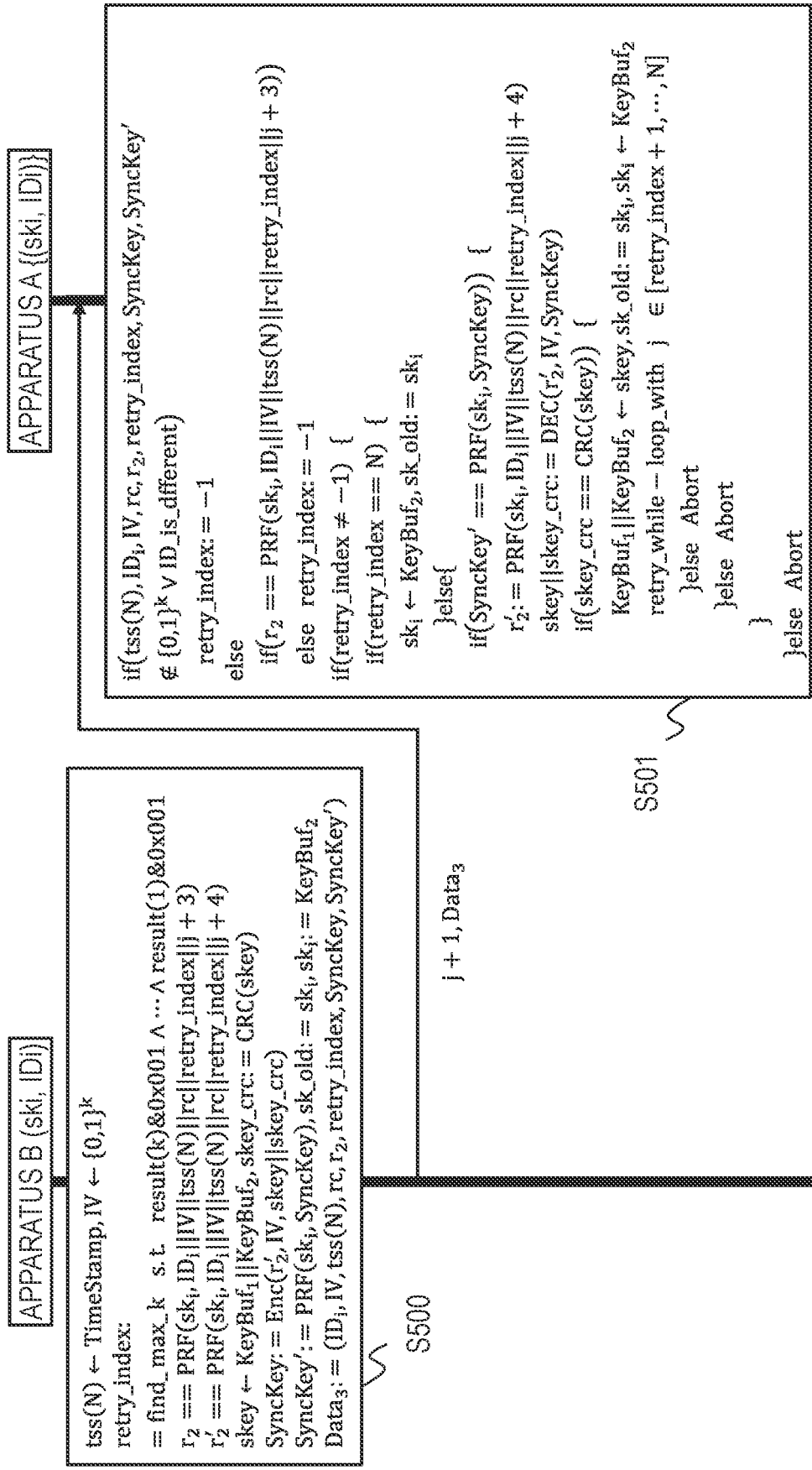
FIG. 6B is a diagram showing the flow of a transfer protocol according to a modification of the embodiment 2.

In the sequences shown in FIGS. 5A and 5B, the handshake is performed for each transfer as indicated in 5302 of FIG. 5B. That is, in the sequences shown in FIGS. 5A and 5B, the apparatuses A2 and B3 always perform the handshake to thereby execute key renewals plural times. Hence, this would be difficult to be considered as being efficient. The re-execution of the key updating from the updating at the number of times subsequent to the number of times at which the apparatus B3 is capable of correctly receiving the updated key from the apparatus A2 yields more efficiency. Sequences in which such efficiency is performed on the sequences shown in FIGS. 5A and 5B are illustrated in FIGS. 6A and 6B. Incidentally, even in the present modification, mutual authentication accompanied with the notification of the number of times of transfers is executed by the sequence shown in FIG. 5A. The sequences according to the modification of the embodiment 2 are therefore comprised of FIG. 5A, FIG. 6A, and FIG. 6B.

The sequences according to the present modification are sequences which execute key updating from the apparatus A2 to the apparatus B3 without any handshake and enables its repetitive operation. Further, in the sequences according to the present modification, identification is performed up to the updating correctly received by the apparatus B3 after execution of key updating corresponding to the specified number of times of transfers (i.e., after execution of N times key updates), and the updating is re-executed from where the updating cannot be received due to some kind of problem.

Description similar to that of the above-mentioned embodiment 2 will be made below while being omitted as appropriate.

<(1) Mutual Authentication Accompanied with Number of Times of Transfers>

Since the same operation as that shown in FIG. 5A is performed, illustrations and their description will be omitted.

After completion of the sequence of the above (1), N times transfers are performed in the following manner.

<(2) Transfers of updated key and message in plural times> (refer to FIG. 6A)

(2-1) Construction of Apparatus Authentication Information in Apparatus A2:

The apparatus A2 executes the following (S400):

1. selects the present time as tss (j)←TimeStamp.

2. generates random numbers in the pseudo random number generation processing unit 201 and assumes the same to be IV←{0 0,1}^k, K (j,1)←{0,1}^k, and K (j,2)←{0,1}^k . K (j,1) is stored in the session key buffer 204-2, and K(j,2) is stored in the buffer 205-2. Here, K (j,1) is a new key used in encryption/decryption processing upon the next transfer. Also, K (j,2) is a new key used in signature issuance verification processing upon the next transfer.

3. continues processing in the pseudo random number generation processing unit 201 and concatenates K (j,1), K (j,2), and a transmission message msg(j) if it exists. Further, the apparatus A2 calculates a CRC or an ECC in the error code processing unit 219. For example, the CRC is assumed to have been calculated, and is defined as d_crc:=CRC (K(j,1)∥K(j,2)∥msg(j)), followed by being stored in the buffer.

4. reads a key value from the session key buffer KeyBuf1 (204-1), calculates C(j):=Enc(KeyBuf1, K(j,1)∥K(j,2)∥msg (j)∥d_crc) in the encryption/decryption processing unit 202 and outputs a calculation result. On the other hand, the apparatus A2 reads a key value from the session key buffer KeyBuf2 (205-1), calculates D(j) : PRF (KeyBuf2, IDi∥tss (j)∥IV∥C (j)∥j+3) in the signature issuance verification processing unit 203 and outputs a calculation result.

5. flips the two session key alternation buffers. That is, the buffer 204-2 is replaced with KeyBuf1 (204-1), and the buffer 204-1 is replaced with the buffer 204-2. Likewise, the buffer 205-2 is replaced with KeyBuf2 (205-1), and the buffer 205-1 is replaced with the buffer 205-2.

6. summaries the calculation results obtained in the above into Data(j+1):=(IDi,tss(j),IV,C(j),D(j)) and transmits (j+1, Data(j+1)) to the apparatus B3 to execute j:=j+1. Further, when j>N is satisfied, the apparatus A2 finishes repetitive processing. When j>N is not satisfied, the apparatus A2 continues the repetitive processing. That is, the repetitive processing is executed without performing such a handshake as indicated in S302 of FIG. 5B.

Thus, when the apparatus A2 continuously performs a transfer to the apparatus B3 N times (where N is an integer of 2 or more), the apparatus A2 processes and transfers transfer data including a jth signature shared key and encryption shared key used for a jth transfer by using a j−1th signature shared key and encryption shared key in a j−1th transfer (where j is an integer of 2 or more and N or less). Incidentally, here, the signature shared key is a key (key used by the signature issuance verification processing unit 203) used in issuance or verification processing of a signature. The encryption shared key is a key (key used by the encryption/decryption processing unit 202) used in encryption processing or decryption processing.

(2-2) Data Decryption and Data Storage in Apparatus B3:

The apparatus B3 executes the following (S401):

1. configures an empty set rc as a variable.

2. verifies whether tss(j),IDi,IV,C(j),D(j) ∈{0,1}k, i.e., the lengths of their respective data are respectively defined as a predetermined value, and determines whether IDi coincides with its own one. When they are not satisfied, the apparatus assumes result(j):=000 and shifts processing to the following Step 7. When they are satisfied, the following operations are executed.

3. reads a key value from the session key buffer KeyBuf2 (205-1), and verifies in the signature issuance verification processing unit 203 whether D(j)=PRF(KeyBuf2, IDi∥tss (j)∥IV∥C (j)∥j+3) is satisfied. When the result of its verification is not satisfied, the apparatus B3 assumes result(j):=110. When the verification result is satisfied, the following processing are executed.

4. reads a key value from the session key buffer KeyBuf1 (204-1). The apparatus B3 executes K (j,1)∥K(j,2)∥ msg(j)∥d_crc:=Deo (KeyBuf1, IV, C(j)) in the encryption/ decryption processing unit 202, and executes the following Step 5 and subsequently.

5. calculates a CRC of K (j,1)∥K (j,2)∥msg (j) obtained by decryption, as CRC(K (j,1)∥K(j,2)∥msg(j)) in the error code processing unit 219 and verifies whether it coincides with d_crc. When they are not coincident with each other, the apparatus B3 assumes result(j):=010. When the verification result is satisfied, the following operations are executed.

6. stores K (j,1) obtained as a decryption result in the session key buffer 204-2 and stores K (j,2) in the buffer 205-2. The apparatus B3 flips the two session key alternation buffers. That is, the buffer 204-2 is replaced with KeyBuf1 (204-1), and the buffer 204-1 is replaced with the buffer 204-2. Likewise, the buffer 205-2 is replaced with KeyBuf2 (205-1), and the buffer 205-1 is replaced with the buffer 205-2. Further, the apparatus B3 assumes result (j):=001.

7. defines rc as rc:=rc∥result (j), and adds result (j) to the empty set rc. Further, when j=N is satisfied, the apparatus B3 finishes the repetitive processing. When j=N is not satisfied, the apparatus B3 enters a data reception waiting from the apparatus A2 and continues the repetitive processing.

When a time out occurs or N-times receptions are completed in the apparatus B3, the operations of the sequence shown in the following (3) are executed.

<(3) Updating and Synchronization of Pre-Shared Key Accompanied with Mutual Authentication and Identification of Re-execution Index>(refer to FIG. 6B)

(3-1) Identification of Re-execution Index and Updating of Pre-Shared Key in Apparatus B3:

The apparatus B3 executes the following (S500):

1. selects the present time as tss(N)←TimeStamp, generates a random number in the pseudo random number generation processing unit 201, and defines the same as IV←{0, 1}^k.

2. substitutes the maximum k at which result(k)&0× 001^...^ result (1)&0×001 becomes true (1 as a value), into retry_index. That is, retry_index indicates the number of times of consecutive transfer success counted from the first transfer of transfer data. In other words, retry_index is the number of times which is counted from the first transfer of the transfer data and yields a consecutive success in key synchronization.

3. calculates r2:=PRF(ski,IDi∥tss (N)∥rc∥ retry_index∥1) in the signature issuance verification processing unit 203 by using the pre-shared key ski already stored in the nonvolatile memory 208 and outputs a calculation result. On the other hand, the apparatus B3 calculates r2':=PRF(ski,IDi∥tss(N)∥rc∥retry_index∥2) in the signature issuance verification processing unit 203 and stores the same in the issued signature buffer 207.

4. concatenates the value of the session key buffer KeyBuf1(204-1) and the value of the session key buffer KeyBuf2(205-1) and substitutes its result into skey (skey:=KeyBuf1∥KeyBuf2). Then, the apparatus B3 calculates a CRC or an ECC in the error code processing unit 219. For example, the CRC is assumed to have been calculated and is defined as skey_crc:=CRC(skey).

5. reads the key r2' from the issued signature buffer 207, calculates SyncKey:=Enc(r2',IV,skey∥skey_crc) in the encryption/decryption processing unit 202 and outputs a calculation result. On the other hand, the apparatus B3 executes SyncKey':=PRF(ski,SyncKey) in the signature issuance verification processing unit 203.

6. executes sk_old:=ski, and ski:=KeyBuf2 within the buffer as the updating of the pre-shared key ski already registered in the nonvolatile memory 208. Here, sk_old registration and ski updating are executed in the nonvolatile memory 208.

7. summaries the calculation results obtained in the above into Data3:=(IDi,tss(N),IV,rc,r2,retry_index, SyncKey,SyncKey') and transmits (j+1, Data3) to the apparatus A2 to finish the processing. However, when a processing interruption notification from the apparatus A2 is received, interruption processing to be described in the following (3-2) is executed.

Thus, the apparatus B3 transfers to the apparatus A2, transfer data including the number of times of consecutive success of transfers counted from a first transfer of transfer data, and the latest signature shared key and encryption shared key which are encrypted by the encryption/decryption processing unit 202 using the pre-shared key shared in advance between the apparatus A2 and the apparatus B3 and which are obtained from the apparatus A2 by the apparatus B3.

Further, when the transfer of the transfer data including the number of times of consecutive transfer success, and the signature shared key and the encryption shared key is performed, the apparatus B3 adopts the signature shared key (value of KeyBuf2) as a new pre-shared key. Incidentally, the apparatus B3 may adopt the encryption shared key (value of KeyBuf1) as a new pre-shared key.

(3-2) Verification of Re-execution Index and Verification of Pre-shared key Updating in Apparatus A2:

The apparatus A2 executes the following upon receipt of (j+1, Data3=(IDi,tss(N),IV,rc,r2,retry index, SyncKey, SyncKey'))(S501).

1. verifies whether IDi,tss(N),IV,rc,r2,retry_index, SyncKey, SyncKey'∈{0,1}^k, i.e., the lengths of their respective data are respectively defined as a predetermined value, and determines whether IDi is an ID registered as an ID of the apparatus B3. When they are not satisfied, retry_index:=−1, and the apparatus A2 shifts processing to the following Step 3. When they are satisfied, the following operations are executed.

2. executes in the signature issuance verification processing unit 203 by using the pre-shared key ski already stored in the nonvolatile memory 208 whether or not r2==PRF(ski, IDi∥tss(N)∥rc∥retry_index∥1) is satisfied. When the result of its execution is not satisfied, retry_index:=−1.

3. confirms whether retry_index≠−1. When the result of its confirmation is not satisfied, the apparatus A2 executes interruption processing. When the confirmation result is satisfied, the following operations are executed.

4. confirms whether retry_index==N. When the result of its confirmation is satisfied, the apparatus A2 executes sk_old:=ski and ski:=KeyBuf2 within the buffer as the updating of the pre-shared key ski already registered in the nonvolatile memory 208. Here, sk_old registration and ski updating are executed in the nonvolatile memory 208. Then, the apparatus A2 finishes the processing. When the confirmation result is not satisfied, the following operations are executed.

5. verifies in the signature issuance verification processing unit 203 whether SyncKey'==PRF(ski,SyncKey) is satisfied. When the result of its verification is not satisfied, the apparatus A2 executes interruption processing. When the verification result is satisfied, the decryption processing is possible, and hence the apparatus A2 calculates r2':=PRF (ski, IDi∥tss(N)∥rc∥retry_index∥2) again in the signature issuance verification processing unit 203 and stores a calculated value in the issued signature buffer 207. This is used as a key for the encryption/decryption processing unit 202 to thereby execute skey∥skey_crc:=Dec(r2', IV,SyncKey) and execute the following Step 6 and subsequently.

6. calculates a CRC of skey obtained by decryption, as CRC (skey) in the error code processing unit 219 and verifies whether it coincides with skey_crc. When they are not coincident with each other, the apparatus A2 executes interruption processing. When the verification result is satisfied, the following operations are executed.

7. acquires two concatenated keys from skey, stores an upper-order side bit string in KeyBuf1 (204-1) and stores a lower-order side bit string in KeyBuf2 (205-1). Further, the apparatus A2 executes sk_old:=ski and ski:=KeyBuf2 within the buffer as the updating of the pre-shared key ski already registered in the nonvolatile memory 208. Here, sk_old registration and ski updating are executed in the nonvolatile memory 208. Then, the repetitive processing described in the above (2) is re-executed in a range of j∈[retry_index+1,N].

Thus, the apparatus A2 decrypts the transfer data transferred from the apparatus B3 by using the pre-shared key, and re-executes transfers of the number of times next and subsequent to the number of times of the consecutive success of the transfers by using for the first transfer of retransfers, the signature shared key and the encryption shared key obtained by the decryption. It is therefore possible to safely re-execute the transfer.

Further, when the transfer of the transfer data including the number of times of the consecutive success, and the signature shared key and the encryption shared key from the apparatus B3 is performed, the apparatus A2 adopts the signature shared key as a new pre-shared key. Incidentally, when the apparatus B3 adopts the encryption shared key as a new pre-shared key, the apparatus A2 adopts the encryption shared key as a new pre-shared key. Since the updating of the pre-shared key is performed in this manner, the safety can be enhanced.

In the interruption processing at the apparatus A2, the apparatus A2 notifies processing interruption to the apparatus B3. This interruption notification is done in mutual authentication using ski prior to its updating. In particular, in the mutual authentication based on the present interruption notification, the apparatus B3 executes signature verification using ski and sk_old and executes the identification of the pre-shared key. When sk_old is identified as the pre-shared key, ski:=sk_old is executed as cancel processing and reflected on the nonvolatile memory 208 of the apparatus B3. The apparatus B3 issues a signature by using the identified pre-shared key and notifies the same to the apparatus A2. The apparatus A2 executes signature verification using ski before being updated. When this is passed, the identification of the pre-shared key between the apparatus A2 and the apparatus B3 is completed. When the identification of the pre-shared key is successful, the present protocol can be executed again from the beginning. With the completion of the interruption processing, the execution of the present protocol is interrupted.

Now, when the processing is normally completed in the apparatus A2, the keys K (j,1) and K (j,2) and msg(j) are not falsified by a main in the middle and leaked thereto, and are prevented from lacking. In particular, K (j,1), K (j,2) and msg(j) are successfully stored in a key storage region of the apparatus B3. That can also said about until the time when N is indicated by retry_index even when the repetitive processing is re-executed because retry_index<N. In the case other than that, a failure factor analysis is possible with the value of result (j), which is stored in rc. When the value is 010, its processing is recorded as a write failure due to value lacking at writing. When the value is 100, its processing is recorded as a failure in signature verification processing before the data decryption. When the value is 110, its processing is recorded as a reception error (possibility of message falsification).

Particularly, when the repetitive processing is re-executed because retry_index<N, the pre-shared key is updated, and hence even if the pre-shared key before the repetition leaks, the key is not subjected to the fastest use upon re-execution and is safe.

The present protocol is fail safe because when any of IV, C(j), and D(j) is falsified, the verification of the signature in the apparatus B3 issued from the apparatus A2 is failed. Further, the signature r2 is issued in the apparatus B3, and hence it is not possible for an attacker to make verification in the apparatus A2 successful with the falsification of the value of rc. When all or any of IV, C(j), and D(j) is falsified, it is possible to detect the occurrence of some falsification.

The embodiment 2 and its modification have been described above. In the repetitive transfer operation of the updated key, key generation, key encryption and its signature generation are carried out sequentially. In the above-described configuration, the session key alternation buffers are used. Therefore, the key generation/encryption/signature issuance in the repetitive operation can be executed at high speed with a stronger configuration in which access from other than the encryption/decryption processing unit 202, the signature issuance verification processing unit 203, and the nonvolatile memory 208 does not exist physically.

Embodiment 3

An embodiment 3 will next be described. The embodiment 3 is different from the embodiment 2 in that cryptographical pseudo random numbers are used.

Figure 7:
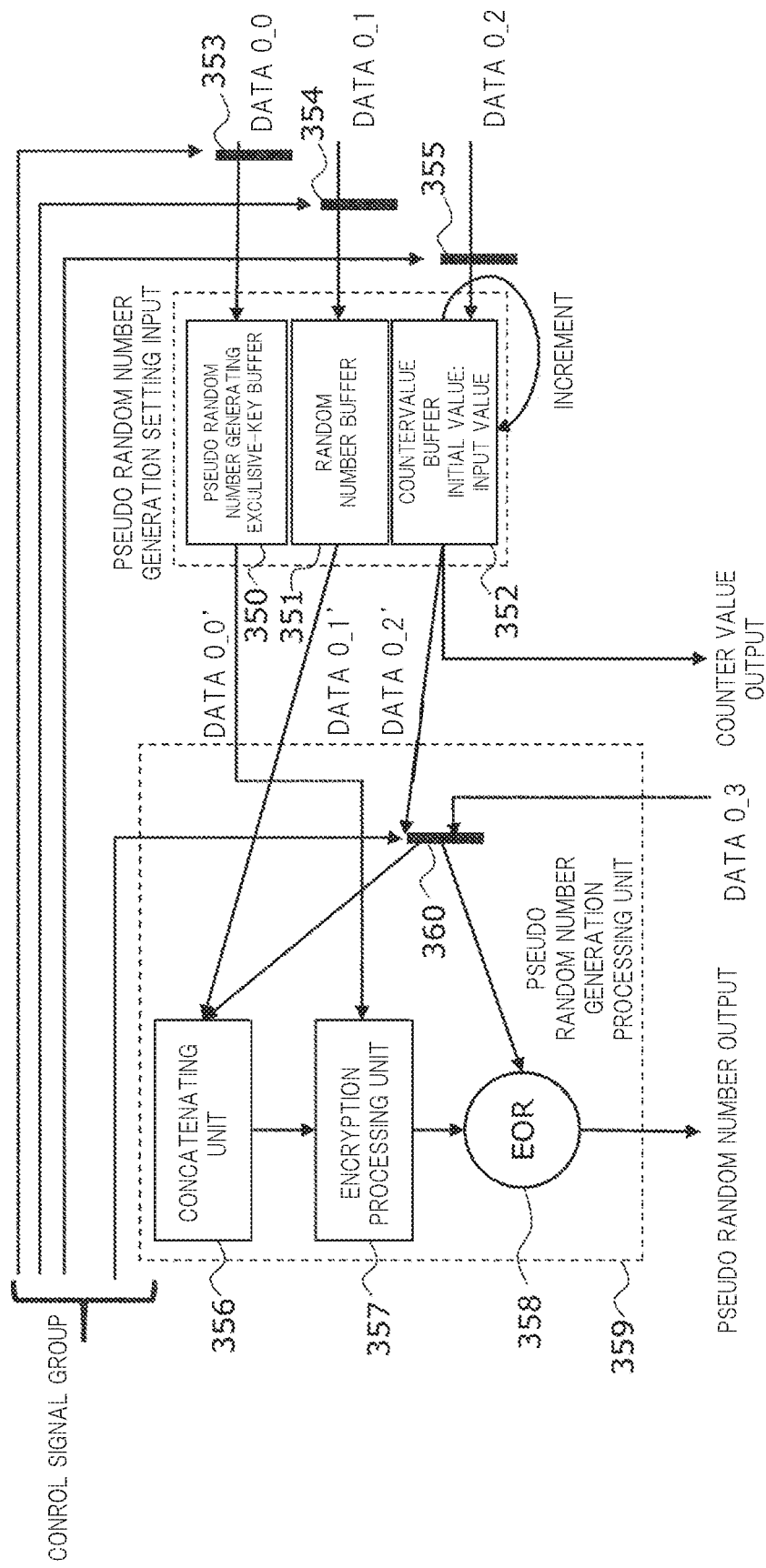
FIG. 7 is a diagram showing a configuration example of a pseudo random number generator.

FIG. 7 shows a configuration example of a pseudo random number generator using an input random number, an offset value (counter value), and a key. There are provided three of a pseudo random number generating exclusive-key buffer 350, a random number buffer 351, and a counter value buffer 352 for the purpose of setting in pseudo random number generation. Inputs to the respective buffers are respectively controlled by selectors 353, 354, and 355 on the basis of an instruction of a control signal group to control whether to capture external inputs. The pseudo random number generating exclusive-key buffer 350 is a buffer memory which stores a set value of a key used in the generation of a pseudo random number. The random number buffer 351 is a buffer memory which stores a set value of a random number used in the generation of a pseudo random number. The counter value buffer 352 is a buffer memory which stores a set value of a counter value used in the generation of a pseudo random number.

The value settings to the pseudo random number generating exclusive-key buffer 350 and the random number buffer 351 are done by a protocol accompanied with apparatus-to-apparatus mutual authentication at the first of one or more session updated-key deliveries. Further, the updating of a pseudo random number generating exclusive key started with the redelivery between transmission and reception devices may be executed.

The setting of an initial value to the counter value buffer 352 is done by a protocol accompanied by apparatus-to-apparatus mutual authentication only at the fist of one or more session updated key deliveries. After such a setting, the counter value is incremented each time the pseudo random number is generated in a pseudo random number generation processing unit 359. The counter value is readable within an HSM 10.

The pseudo random number generation processing unit 359 has a concatenating unit 356, an encryption processing unit 357, and an exclusive OR operation unit 358. The concatenating unit 356 concatenates a set value of the random number buffer 351 and a set value of the counter value buffer 352. The encryption processing unit 357 uses the set value of the pseudo random number generating exclusive-key buffer 350 as an encryption key and performs block encryption processing on the output of the concatenating unit 356. The exclusive OR operation unit 358 calculates the exclusive OR of the result of encryption by the encryption processing unit 357 and the set value of the counter value buffer 352. The result of calculation by the exclusive OR operation unit 358 is output from the pseudo random number generation processing unit 359 as a (cryptographical) pseudo random number. That is, assuming that an encryption key value is KeyCSRNG, a random number value is RandCSRNG, and a counter value is CntCSRNG, the pseudo random number generation processing unit 359 executes:

c1_:=Enc(KeyCSRNG, RandCSRNG∥CntCSRNG)
c1:=c1_EOR CntCSRNG, and outputs the result c1. Then, the counter value buffer 352 executes:
CntCSRNG:=CntCSRNG+1.

Here, the pseudo random number generation processing unit 359 is also capable of specifying a counter value from the outside and outputting a (cryptographical) pseudo random number. A selector 360 selects whether the value to be used is a value from the counter value buffer 352 or an external input value.

Figure 8:
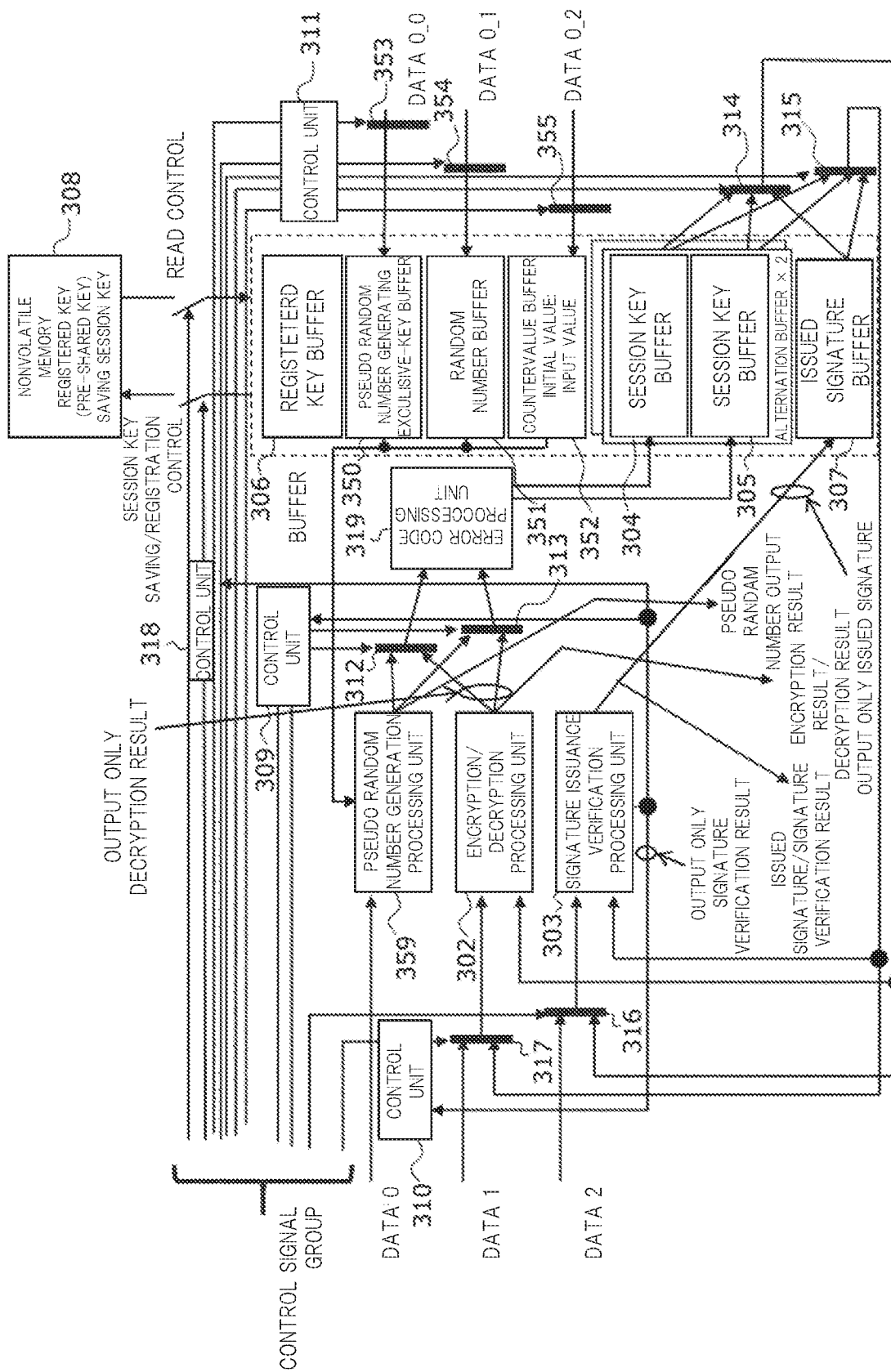
FIG. 8 is a block diagram showing one example of a configuration of an HSM according to an embodiment 3.

FIG. 8 is a block diagram showing one example of the configuration of the HSM 10 according to the embodiment 3. Using FIG. 8, description will be made as to a hardware configuration which is capable of using a cryptographical pseudo random number stored in the corresponding alternation buffer as an updated key and performs encryption/decryption processing, signature issuance verification processing, and key storage.

As illustrated in FIG. 8, the HSM 10 according to the embodiment 3 has a pseudo random number generation processing unit 359, an encryption/decryption processing unit 302, a signature issuance verification processing unit 303, session key buffers 304 and 305, a registered key buffer 306, an issued signature buffer 307, a pseudo random number generating exclusive-key buffer 350, a random number buffer 351, a counter value buffer 352, an error code processing unit 319, a nonvolatile memory 308, control units 309, 310, 311, and 318, and selectors 312, 313, 314, 315, 316, 317, 353, 354, and 355.

Thus, the apparatus A2 and the apparatus B3 respectively have the pseudo random number generation processing units 359 each having the function of generating a cryptographical pseudo random number uniquely determined by a predetermined key, a predetermined random number, and an arbitrary counter value. Incidentally, the counter value used in the pseudo random number generation processing unit 359 of the apparatus A2, and the counter value used in the pseudo random number generation processing unit 359 of the apparatus B3 are both values changed by a predetermined value (specifically, +2) for each consecutive transfer of N times. Here, the pseudo random number generation processing unit 359 is assumed to have the above-mentioned function and include the pseudo random number generation processing unit 201 shown in FIG. 4 therein. Incidentally, as described above, the pseudo random number generation processing unit 359 is also capable of specifying a counter value from the outside and outputting a (cryptographical) pseudo random number. Data 0_3 shown in FIG. 7, which is a counter value specified from the outside corresponds to data 0 in FIG. 8.

Further, respective elements to be shown below are similar in configuration and operation to the respective elements shown in FIG. 4. The encryption/decryption processing unit 302 corresponds to the encryption/decryption processing unit 202 shown in FIG. 4. The signature issuance verification processing unit 303 corresponds to the signature issuance verification processing unit 203 shown in FIG. 4. The session key buffers 304 and 305 correspond to the session key buffers 204 and 205 shown in FIG. 4 respectively. The registered key buffer 306 corresponds to the registered key buffer 206 shown in FIG. 4. The issued signature buffer 307 corresponds to the issued signature buffer 207 shown in FIG. 4. The error code processing unit 319 corresponds to the error code processing unit 219 shown in FIG. 4. The nonvolatile memory 308 corresponds to the nonvolatile memory 208 shown in FIG. 4. The selectors 312, 313, 314, 315, 316, and 317 correspond to the selectors 212, 213, 214, 215, 216, and 217 shown in FIG. 4 respectively. The control units 309, 310, and 318 correspond to the control units 209, 210, and 218 shown in FIG. 4 respectively. Incidentally, the control unit 311 corresponds to the control unit 211 shown in FIG. 4 and is different from the control unit 211 in that it controls the selectors 353, 354, and 355.

In the description of the present embodiment, description similar to that of the embodiment 2 or its modification will be made while being omitted as appropriate.

Each sequence shown in FIG. 6 is accompanied by the problem that the key updating from the apparatus A2 to the apparatus B3 can repeatedly be executed without any handshake, but when a problem arises in terms of the decryption of the value of an update key even once in the middle of the repetitive updating, subsequent key updating is failed. When considering the scene of use of a data transfer, there is also a case in which the transfer of data itself becomes unnecessary, or there is also a case in which an ability to cause the latest data to reach the reception side as much as possible and correctly decrypt the data on the reception side is desired as compared with the case of the transmitting loss of data. Therefore, in the present embodiment, there are shown sequences in FIGS. 9A through 9E, in which even in the case where some problem occurs during the execution of key updating corresponding to the specified number of times of transfers and hence key updating is failed, the key value having failed to be received can be prepared by the apparatus on the reception side when authentication about the counter value is passed.

The sequences of FIGS. 9A through 9E are different from the sequences of FIG. 6 even in that it is verified whether the updated key can be correctly obtained at which number of times of transfer, and the key updating is re-executed from where it cannot be done due to some problem. Incidentally, assuming that the updated key can be correctly acquired even where the key generation is carried out in the apparatus B3 when the key fails to be received, it is identified whether the updated key can be correctly obtained at what number of times of transfer. The sequences shown in FIGS. 9A through 9E will be specifically described below.

<(1) Mutual Authentication Accompanied with Number of Times of Transfer>(refer to FIG. 9A)
(1-1) Construction of Apparatus Authentication Information in Apparatus A2:

The apparatus A2 executes the following (S600):
1. selects the present time as tss←TimeStamp.
2. generates random numbers in the pseudo random number generation processing unit 359 and assumes the same to be IV←{ 0,1}^k, isk←{0,1}^k, isk0^{0,1}^k, Nonce←{0,1}^k, icnt←{0,1}^k, and sk(0)←{0,1}^k . Here, IV is an initial vector used in block encryption. Also, isk is a key for signature issuance. sk(0) is a new pre-shaped key to be shared with the apparatus B3. Further, isk0 is a key value used in the pseudo random number generation processing unit 359, Nonce is a value of a random number used in the pseudo random number generation processing unit 359, icnt is an initial value of a counter value used in the pseudo random number generation processing unit 359. After the transfer of the generated random number to the buffer, the apparatus A2 stores isk0 in the pseudo random number exclusive key KeyBufCSRNG (305) within the buffer, stores Nonce in the random number buffer Rand-BufCSRNG (351), and stores icnt in the counter value buffer CntBufCSRNG (352). That is, KeyBufCSRNG←isk0, RandBufCSRNG←Nonce, and CntBufCSRNG←icnt are executed.

3. continues processing in the pseudo random number generation processing unit 359 and concatenates isk, isk0, Nonce, icnt, and sk (0). Further, the apparatus A2 calculates a CRC or an ECC in the error code processing unit 319. For example, the CRC is assumed to have been calculated, and is defined as d_crc:=CRC (isk||isk0||Nonce||icnt||sk(0)), followed by being stored in the session key buffer 304-2. Sk(0) is stored in the additional session key buffer 305-2.

4. calculates r1:=PRF(ski,IDi||tss||IV||N||1) in the signature issuance verification processing unit 303 and outputs a calculation result. On the other hand, the apparatus A2 calculates r1':=PRF(ski,IDi||tss||IV||N||2) in the signature issuance verification processing unit 303.

5. stores r1' into the session key buffer KeyBuf1 (304-1) and stores isk into the session key buffer KeyBuf2(305-1).

6. reads a key from the session key buffer KeyBuf1(304-1), calculates c1:=Enc(r1',IV, isk||isk0||Nonce||icnt ||sk(0) ||d_crc) in the encryption/decryption processing unit 302 and outputs a calculation result. On the other hand, the apparatus A2 executes c1':=PRF(ski,c1) in the signature issuance verification processing unit 303.

7. In preparation for the updating of the pre-shared key ski already registered in the nonvolatile memory 308, sk_old:=ski, and ski:=sk(0) are executed in the buffer. Here, sk_old registration and ski updating may be executed in the nonvolatile memory 308.

8. summaries the calculation results obtained in the above into Data1:=(IDi,tss,IV,rl,c1,c1',N) and transmits (1, Data1) to the apparatus B3.

(1-2) Data Decryption and Data Storage in Apparatus B3:
The apparatus B3 executes the following (S601):

1. generates a random number rc←{0,1}^(k-3) in the pseudo random number generation processing unit 359 and executes random number output.

2. verifies whether tss, IDi, IV, r1, c1, c1',N ∈{ 0,1}^k, i.e. , the lengths of their respective data are respectively defined as a predetermined value, and determines whether IDi coincides with its own one. When they are not satisfied, result1:=000, and the apparatus B3 shifts processing to the following Step 7. When they are satisfied, the following operations are executed.

3. verifies in the signature issuance verification processing unit 303 whether r1=PRF (ski, IDi||tss||IV||N||1) is satisfied. When the result of its verification is not satisfied, result1:= 110. When the verification result is satisfied, N is identified as the number of times of transmission, and the following processing are executed.

4. verifies in the signature issuance verification processing unit 303 whether c1'=PRF (ski, c1) is satisfied. When the result of its verification is not satisfied, result1:=100. Since decryption processing is enabled when the verification result is satisfied, the apparatus B3 calculates r1':=PRF (ski, IDi||tss||IV||N||2) again in the signature issuance verification processing unit 303 and stores its calculated value in the issued signature buffer 307, followed by being stored in the session key buffer KeyBuf1 (304-1) within the buffer. The apparatus B3 uses this as a key of the encryption/decryption processing unit 302 and executes isk||isk0||Nonce||icnt||sk (0)||d_crc:=Dec (r1',IV, c1). Then, the apparatus B3 transfers each value to the error code processing unit 319 and the buffer and executes the following Step 5 and subsequently.

5. calculates a CRC of isk||sk0||Nonce||icnt||sk(0) obtained by decryption as CRC(isk||isk0||Nonce||icnt ||sk(0)) in the error code processing unit 319 and verifies whether it coincides with d_crc. When they do not coincide with each other, result1:=010. When the result of its verification is satisfied, the following operations are executed.

6. stores within the buffer, isk0 in the pseudo random number exclusive key KeyBufCSRNG(350), Nonce in the random number buffer RandBufCSRNG(351), and icnt in the counter value buffer CntBufCSRNG(352). That is, KeyBufCSRNG←isk0, RandBufCSRNG←Nonce, and CntBufCSRNG←icnt are executed. The apparatus B3 writes isk into the session key storage buffer KeyBuf2(305-1) and stores sk(0) into the additional session key buffer 305-2. In preparation for the updating of the pre-shared key ski already registered in the nonvolatile memory 308, the apparatus B3 executes sk_old:=ski, and ski:=sk(0) within the buffer. The apparatus B3 executes key registration of isk and sk_old and ski updating with background processing in the nonvolatile memory 308. At this time, since the signature verification is in success in the above Step 4, writing into the nonvolatile memory 308 is possible. This writing may also be defined as writing of an encryption result like Enc.ECB (sk0,isk), using a secrete key sk0 inherent to each apparatus. Further, result1:=001.

7. calculates rc:=ro||result1, and r2:=PRF(ski, TDi||tss||IV||rc||3) in the signature issuance verification processing unit 303.

8. summaries the calculation results obtained in the above into Data2:=(IDi,tss,IV,r2,rc) and transmits (1, Data2) to the apparatus A2.

(1-3) Verification of Authentication Result in Apparatus A2:
The apparatus A2 executes the following (S602).

Upon receipt of (2,Data2 =(IDi,tss,IV,r2,rc)), the apparatus A2 verifies whether or not IDi, tss, IV, r2, rc∈{0,1}^k, i.e., the lengths of their respective data are respectively defined as a predetermined value, and verifies whether IDi is an ID registered as an ID of the apparatus B3. When the results of verification are not satisfied, result2:=000. When the verification results are satisfied, the apparatus A2 verifies in the signature issuance verification processing unit 303 included in the apparats A2 whether r2=PRF(ski,IDi||tss||IV||rc||3). When the verification result is correct, it is defined to be low-order 3 bits of result2:=rc. When it is not correct, result2:=111. Then, result2 is output as an authentication result and recorded. Here, when result2 is 001, the key updating of the pre-shared key, which is executed within the buffer is reflected on the nonvolatile memory 308 with the background processing. When already reflected thereon, this processing is not necessary. Further, an index variable j for repetitive processing is set to 1. On the other hand, when result2 is not 001, the key updating is cancelled, and ski:=sk_old is executed within the buffer. When the key updating has already been reflected on the nonvolatile memory 308, the key updating is cancelled in the nonvolatile memory 308. Further, at this time, the apparatus A2 interrupts the processing and notifies the processing interruption to the apparatus B3. This interruption notification is done in mutual authentication using ski prior to the updating. In particular, in the mutual authentication based on the present interruption notification, the apparatus B3 executes signature verification using ski and sk_old and executes the identification of the pre-shared key. When sk_old is identified as the pre-shared key, ski:=sk_old is executed as cancel processing and reflected on the nonvolatile memory 308 of the apparatus B3. The apparatus B3 issues a signature by using the identified pre-shared key and notifies the same to the apparatus A2. The apparatus A2 executes signature verification using ski before being updated. When this is passed, the identification of the pre-shared key between the apparatus A2 and the apparatus B3 is completed. When the identification of the pre-shared key is successful, the present protocol can be executed again from the beginning. With the completion of the interruption processing, the execution of the present protocol is interrupted.

Now, when result2 is 001 in the apparatus A2, its processing is recorded assuming that the keys isk, isk0 and sk (0), and input information Nonce and icnt for cryptographical pseudo random number generation are not falsified by a man in the middle and leaked thereto, and are prevented from lacking, and further, all of these are successfully stored in a key storage region of the apparatus B3. Further, when result2 is 010, its processing is recorded as a write failure due to value lacking at writing. When result2 is 100, its processing is recorded as a failure in signature verification processing before the data decryption. When result2 is 110, its processing is recorded as a reception error (possibility of message falsification).

The present protocol is fail safe because when any of IV, c1, c1', and r1 is falsified, the verification of the signature in the apparatus B3 issued from the apparatus A2 is failed. Further, the signature r2 is issued in the apparatus B3, and hence it is not possible for an attacker to make verification in the apparatus A2 successful with the falsification of the value of rc. When all or any of IV, c1, c1', r1 and rc is falsified, it is possible to detect the occurrence of some falsification.

After completion of the sequence of the above (1), N times transfers are performed in the following manner.
<(2) Transfers of updated key and message in plural times>
(refer to FIGS. 9B, 9C and 9D)
(2-1) Construction of Apparatus Authentication Information in Apparatus A2: (refer to FIG. 9B)

The apparatus A2 executes the following without waiting for a response from the apparatus B3 (S700). When the response is received, the apparatus A2 executes processing of (2-3) to be described later. When the processing is normally completed and repetitive processing is continued, the apparatus A2 executes the following continuously. Incidentally, when the index of a message from the apparatus B3 is an even number, the apparatus A2 identifies that the repetitive processing is continued. When j>N and the index of the message from the apparatus B3 is an odd number, the apparatus A2 identifies that the repetitive processing has already been completed.

1. selects the present time as tss (j)←TimeStamp.
2. generates a random number in the pseudo random number generation processing unit 359 and assumes the same to be IV←{0,1}^k .
3. reads a value of the counter value buffer CntBufCSRNG (352), subtracts 2 from the read value and substitutes its result into pre_cnt. That is, the apparatus A2 executes pre_cnt←CntBufCSRNG-2 and calculates pre_cnt ':=PRF (ski, IDi∥tss (j)∥pre_cnt∥2×(j+1)) in the signature issuance verification processing unit 303.
4. executes the following by using the cryptographical pseudo random number generating function of the pseudo random number generation processing unit 359:
   tmp1:=Enc (KeyBufCSRNG, RandBufCSRNG∥CntBufCSRNG)
   K (j,1):=tmp1 EOR CntBufCSRNG
   CntBufCSRNG←CntBufCSRNG+1
   tmp2:=Enc (KeyBufCSRNG, RandBufCSRNG∥CntBufCSRNG)
   K (j,2):=tmp2 EOR CntBufCSRNG
   CntBufCSRNG←CntBufCSRNG+1

Then, the apparatus A2 stores K (j,1) in the session key buffer 304-2 and stores K (j,2) in the buffer 305-2. Thus, the cryptographical pseudo random number generated from the pseudo random number generation processing unit 359 is used as each of a signature shared key and an encryption shared key.

5. continues processing in the pseudo random number generation processing unit 359 and concatenates K (j,1), K (j,2), and a transmission message msg(j) if it exists. Further, the apparatus A2 calculates a CRC or an ECC in the error code processing unit 319. For example, the CRC is assumed to have been calculated, and is defined as d_crc:=CRC (K(j,1)∥K(j,2)∥msg(j)), followed by being stored in the buffer.

6. reads a key value from the session key buffer KeyBuf1 (304-1), calculates C(j):=Enc(KeyBuf1, K(j,1)∥K (j,2)∥msg (j)∥d_crc) in the encryption/decryption processing unit 302 and outputs a calculation result. On the other hand, the apparatus A2 reads a key value from the session key buffer KeyBuf2 (305-1), calculates D(j):=PRF (KeyBuf2, IDi∥tss (j)∥IV∥C (j)∥(j+3)) in the signature issuance verification processing unit 303 and outputs a calculation result.

7. flips the two session key alternation buffers. That is, the buffer 304-2 is replaced with KeyBuf1 (304-1), and the buffer 304-1 is replaced with the buffer 304-2. Likewise, the buffer 305-2 is replaced with KeyBuf2 (305-1), and the buffer 305-1 is replaced with the buffer 305-2.

8. summaries the calculation results obtained in the above into Data (j+2):=(IDi,tss(j),IV,pre_cntr,C(j),D(j)) and transmits (2×j, Data (j+2)) to the apparatus B3 to execute j:=j+1.

Thus, upon each transfer, the apparatus A2 also transmits to the apparatus B3, the signature (pre_cnt') for the counter value managed by the apparatus A2, which is generated by the signature issuance verification processing unit 303 by using the pre-shared key shared in advance between the apparatus A2 and the apparatus B3.

(2-2)Data Decryption and Data Storage in Apparatus B3: (refer to FIG. 9C)

When the apparatus B3 receives a message from the apparatus A2 and its index is an even number, the apparatus B3 executes the following after the completion of the present processing (S701). Incidentally, each time the apparatus B3 receives a message from the apparatus A2, the value of the counter value buffer CntBufCSRNG(352) is incremented by +2.

1. configures empty sets rc and flg as variables.
2. verifies whether tss (j) ,IDi, IV, pre_cnt',C(j),D(j)∈{0, 1}^k, i.e., the lengths of their respective data are respectively defined as a predetermined value, and determines whether IDi coincides with its own one. When they are not satisfied, the apparatus B3 assumes result (j):=000 and shifts processing to the following Step 12. When they are satisfied, the following operations are executed.
3. assumes ok_flg(j):=1, reads a value from the counter value buffer CntBufCSRNG(352), and executes pre_cnt←CntBufCSRNG—2.
4. confirms whether j>1 and result(j−1)≠001, i.e., key updating is failed in the previous processing. When it fails, the apparatus B3 executes the following. That is, the apparatus B3 generates a key which should have been acquired upon the previous transfer. When it succeeds, the apparatus B3 shifts processing to the following Step 7.

5. confirms whether pre_cnt':=PRF(ski,IDi||tss(j)||pre_cnt||2×(j+1)). When the result of its confirmation is satisfied, the apparatus B3 executes the following. When the confirmation result is not satisfied, the apparatus B3 assumes ok_flg(j):=0, and shifts the processing to the following Step 12. In the present Step 5, the apparatus B3 verifies the signature of each counter value to thereby confirm whether the counter value managed by the apparatus A2 and the counter value managed by the apparatus B3 are synchronized. Thus, only when the signature transmitted from the apparatus A2 passes verification by the signature issuance verification processing unit 303 using the counter value and the pre-shared key managed by the apparatus B3, the apparatus B3 generates a signature shared key and an encryption shared key used for a jth transfer by means of the pseudo random number generation processing unit 359. It is therefore possible to decrypt the key only when the counter value managed by the apparatus A2 and the counter value managed by the apparatus B3 are synchronized.

6. executes the following using the cryptographical pseudo random number generating function of the pseudo random number generation processing unit 359 to generate an encryption/decryption key (K(j,1)) and a signature issuance/verification key (K (j , 2)). That is, when the apparatus B3 fails in acquiring the signature shared key and the encryption shared key transmitted from the apparatus A2 upon a j−1th transfer (when failing in synchronizing the signature shared key and the encryption shared key), the apparatus B3 generates a signature shared key and an encryption shared key used for the jth transfer from the pseudo random number generation processing unit 359. It is therefore possible to perform the acquiring processing of transfer data of this time even when the acquisition of the previous transfer data is not performed appropriately.

tmp1:=Enc(KeyBufCSRNG, RandBufCSRNG||pre_cnt)
K(j,1):=tmp1 EOR pre_cnt
pre_cnt←pre_cnt+1
tmp2:=Enc(KeyBufCSRNG, RandBufCSRNG||pre_cnt)
K(j,2):=tmp2 EOR pre_cnt Then, the apparatus B3 stores K(j,1) in the session key buffer KeyBuf1(304-1) and stores K(j,2) in the session key buffer KeyBuf2(305-1).

7. confirms whether ok_flg(j)==1. When the result of its confirmation is satisfied, the apparatus B3 executes the following. That is, when the apparatus B3 has a key necessary for the verification of a signature of data transferred this time and a key necessary for decryption, the apparatus B3 executes the following. When the confirmation result is not satisfied, the apparatus B3 assumes result(j):=110 and shifts the processing to the following Step 12.

8. reads a key value from the session key buffer KeyBuf2 (305-1) and verifies in the signature issuance verification processing unit 303 whether D (j)=PRF (KeyBuf2, IDi||tss (j)||IV||C(j)||j+3). When the result of its verification is not satisfied, the apparatus B3 assumes result(j):=100. When the verification result is satisfied, the apparatus B3 executes the following processing.

9. reads a key value from the session key buffer KeyBuf1 (304-1), executes K (j,1)||K (j,2)||msg (j)||d_crc:=Dec (KeyBuf1, IV, C (j)) in the encryption/decryption processing unit 302, and executes the following Step 10 and subsequently.

10. calculates a CRC of K(j,1)||K (j,2)||msg(j) obtained by decryption as CRC (K (j,1)||K (j,2)||msg (j) in the error code processing unit 319 and verifies whether it coincides with d_crc. When they do not coincide with each other, the apparatus B3 assumes result(j):=010. When the result of its verification is satisfied, the following operations are executed.

11. stores K(j,1) obtained as the decryption result in the session key buffer 304-2, and stores K (j,2) in the buffer 305-2. The apparatus B3 flips the two session key alternation buffers. That is, the buffer 304-2 is replaced with KeyBuf1 (304-1), and the buffer 304-1 is replaced with the buffer 304-2. Further, the buffer 305-2 is replaced with KeyBuf2 (305-1), and the buffer 305-1 is replaced with the buffer 305-2. The apparatus B3 assumes result(j):=001.

12. assumes rc:=rc||result (j) and adds result(j) to the set rc. The apparatus B3 assumes flg:=flg||ok_flg (j) and adds ok_flg (j) to the set flg.

13. confirms whether result (j)≠001. When the result of its confirmation is satisfied, the apparatus B3 executes the following Step 14 and subsequently. That is, when the apparatus B3 fails in acquiring the proper transfer data, the apparatus B3 generates a new pre-shared key (sk(j)) as indicated in Step 14 and subsequently, and transmits the same to the apparatus A2. When the confirmation result is not satisfied, the apparatus B3 continues repetitive processing. When j=N is established, the apparatus B3 finishes the repetitive processing.

14. generates random numbers in the pseudo random number generation processing unit 359 and assumes the same to be sk(j)←{0,1}^k, and IV2←{0,1}^k. The apparatus B3 calculates a CRC or an ECC in the error code processing unit 319. For example, the CRC is assumed to have been calculated, and is defined as sk_crc:=CRC (sk (j)), followed by being stored in the buffer.

15. calculates sr(j):=PRF(ski,IDi||tss(j) ||IV2||N||2×(j+1)1) in the signature issuance verification processing unit 303 and stores the same in the issued signature buffer 307.

16. reads sr(j) from the issued signature buffer 307, assumes the same to be a key, and calculates c(j):=Enc(sr (j),IV2,sk (j)||sk_crc) in the encryption/decryption processing unit 302.

17. reads a key value from the session key buffer KeyBuf2 (305-2) and calculates c'(j):=PRF(ski,c(j)) in the signature issuance verification processing unit 303.

18. in order to update the pre-shared key ski already registered in the nonvolatile memory 308, executes sk_old:=ski, and ski:=sk(j) within the buffer and executes sk_old registration and ski updating in the nonvolatile memory 308.

19. summaries the calculation results obtained in the above into Data(j+3):=(IDi,tss(j),IV2,c(j),c'(j)) and transmits (2×j, Data(j+3)) to the apparatus A2.

Thus, when the apparatus B3 fails in the acquisition of proper transfer data in the j−1th transfer (when fails in the acquisition (synchronization) of the signature shared key and the encryption shared key transmitted in the j−1th transfer from the apparatus A2), the apparatus B3 generates a new pre-shared key and transfers the same to the apparatus A2.

(2-3) Updating of Pre-shared key in Apparatus A2: (refer to FIG. 9D)

When the apparatus A2 receives a response from the apparatus B3 and its index is an even number, the apparatus A2 executes the following after the completion of the present processing (S702).

1. verifies whether tss(j),IDi,IV2,c(j),c'(j)∈{0,1}k, i.e., the lengths of their respective data are respectively defined as a predetermined value, and determines whether IDi coincides with an ID of the apparatus B3. When they are not satisfied, the apparatus A2 assumes result2:=00 and shifts processing to the following Step 6. When they are satisfied, the following operations are executed.

2. confirms whether c'(j)==PRF(ski,c(j)) in the signature issuance verification processing unit 303. When the result of its confirmation is satisfied, the apparatus A2 executes the following operations. When the confirmation result is not satisfied, the apparatus A2 assumes result2:=11 and shifts the processing to the following Step 6.

3. calculates sr(j):=PRF(ski,IDi∥tss(j) ∥IV2∥N∥2×(j+1)+1) in the signature issuance verification processing unit 303 and executes decryption sk(j)∥sk_crc:=Dec(sr (j), IV2 , c (j)) in the encryption/decryption processing unit 302.

4. confirms whether sk_crc==CRC(sk(j)) in the error code processing unit 319. When the result of its confirmation is satisfied, the apparatus A2 executes the following operations. When the confirmation result is not satisfied, the apparatus A2 assumes result2:=10 and shifts processing to the following Step 6.

5. executes sk_old:=ski, and ski:=sk(j) within the buffer to update the pre-shared key ski already registered in the nonvolatile memory 308 because the signature verification is already in success, and executes sk_old registration and ski updating in the nonvolatile memory 308. Further, the apparatus A2 assumes result2:=01.

6. generates random numbers in the pseudo random number generation processing unit 359 and assumes the same to be rand←{0,1}^(k-2). Further, the apparatus A2 assumes result2:=rand∥result2.

7. calculates resp(j):=PRF(sk_old,IDi∥tss(j) ∥IV2∥rand∥N∥2×(j+2)) in the signature issuance verification processing unit 303.

8. summaries the calculation results obtained in the above into Data(j+4):=(IDi,tss(j),IV2,rand,resp(j)) and transmits (2×j+1, Data(j+4)) to the apparatus B3.

Thus, the apparatus A2 and the apparatus B3 update the present pre-shared key, based on the new pre-shared key generated in the apparatus B3. It is therefore possible to enhance the safety of subsequent transfer.

(2-4) Confirmation of Synchronization with Apparatus A2 in Apparatus B3 in terms of Updating of Pre-shared key: (refer to FIG. 9D)

When the apparatus B3 receives a response from the apparatus A2 and its index is an odd number, the apparatus B3 executes the following after the completion of the present processing (S703).

1. confirms whether result(j)≠001. When the result of its confirmation is satisfied, the apparatus B3 executes the following operations. When the confirmation result is not satisfied, the apparatus B3 continues repetitive processing. Particularly when j==N, the apparatus B3 finishes the repetitive processing.

2. verifies whether tss (j) ,IDi, IV2, rand, resp (j)∈{0, 1}^k, i.e., the lengths of their respective data are respectively defined as a predetermined value, and determines whether IDi coincides with its own one. When they are not satisfied, the apparatus B3 executes cancel processing of updating of the pre-shared key in the nonvolatile memory 308 and the buffer. That is, the apparatus B3 executes ski:=sk_old. Further, the apparatus B3 executes interruption processing. When they are satisfied, the following operations are executed.

3. confirms resp(j)==PRF(sk_old,IDi∥tss(j) ∥IV2∥rand∥N∥2×(j+2)) in the signature issuance verification processing unit 303. When the result of its confirmation is satisfied, the following operations are executed.

4. confirms whether Rand&0x003≠01. That is, it is determined in the apparatus A2 whether to fail in updating the pre-shared key. When the result of its determination is not satisfied, i.e., when the updating of the pre-shared key is successful in the apparatus A2, the apparatus B3 continues repetitive processing when j<N, and finishes the repetitive processing when j==N. When the determination result is satisfied, i.e., when the updating of the pre-shared key is failed in the apparatus A2, the apparatus B3 executes cancel processing of the pre-shared key in the nonvolatile memory 308 and the buffer. That is, the apparatus B3 executes ski:=sk_old. Further, the apparatus B3 interrupts the repetitive processing and shifts the processing to (3)"Updating and Synchronization of Pre-shared key Accompanied with Mutual Authentication and Identification of Re-execution Index" to be described later.

In the interruption processing at the apparatus B3, the apparatus B3 notifies processing interruption to the apparatus A2. This interruption notification is done in mutual authentication using ski prior to its updating. In particular, in the mutual authentication based on the present interruption notification, signature verification using ski and sk_old is executed and the identification of the pre-shared key is executed in the apparatus A2. When sk_old is identified as the pre-shared key, ski:=sk_old is executed as cancel processing and reflected on the nonvolatile memory 308 of the apparatus A2. The apparatus A2 issues a signature by using the identified pre-shared key and notifies the same to the apparatus B3. The apparatus B3 executes signature verification using ski before being updated. When this is passed, the identification of the pre-shared key between the apparatus A2 and the apparatus B3 is completed. When the identification of the pre-shared key is successful, the present protocol can be executed again from the beginning. With the completion of the interruption processing, the execution of the present protocol is interrupted.

Now, when the processing is normally completed in the apparatus B3, the keys K (j,1) and K (j,2) and msg(j) are not falsified by a main in the middle and leaked thereto, and are prevented from lacking, with respect to j assumed to be result (j)==001. In particular, K (j,1), K (j,2) and msg(j) are successfully stored in a key storage region of the apparatus B3. In the case other than that, a failure factor analysis is possible with the value of result (j), which is stored in the set rc. When the value is 010, its processing is recorded as a write failure due to value lacking at writing. When the value is 100, its processing is recorded as a failure in signature verification processing before the data decryption. When the value is 110, its processing is recorded as a reception error (possibility of message falsification).

Further, the key decryption using the cryptographical pseudo random number generating function is executed in the apparatus B3 with respect to j assumed to be result (j)≠001, but the pre-shared key ski is updated in each case. More specifically, the signature for the counter value is issued from the apparatus A2 by using the post-updating pre-shared key. After success in verification of the signature, key decryption is performed in the apparatus B3. Therefore, even if the pre-updating pre-shared key leaks, the decryption of the key using the leaked pre-shared key cannot be executed in the apparatus B3 with respect to k>j and k assumed to be result (j)≠001. This therefore provides safety.

When the interruption of the above-described repetitive processing or a time out occurs, or N-times receptions are completed in the apparatus B3, the operations of a sequence shown in the following (3) are executed. <(3) Updating and Synchronization of Pre-Shared Key Accompanied with Mutual Authentication and Identification of Re-execution Index>(refer to FIG. 9E)

(3-1) Identification of Re-execution Index and Updating of Pre-Shared Key in Apparatus B3:

The apparatus B3 executes the following (S800):

1. selects the present time as tss (j)←TimeStamp, generates a random number in the pseudo random number generation processing unit 359, and defines the same as IV←$\{0,1\}^{\wedge}k$.

2. substitutes the maximum k at which result (k) &0x001 becomes true (1 as a value), into resultk, and substitutes the maximum i at which ok_flg (j) &0x001 becomes true (1 as a value), into ok_flgi. Thus, resultk indicates at what number of transfer transfer data can be properly acquired last. Further, ok_flgi indicates what number of transfer is received where the decryption processing of a key is performed last. Next, the apparatus B3 calculates retry_index:=max(resultk, ok_flagi −1). Thus, retry_index can refer to an ordinal number (index) indicating at what number of transfer in N-times transfers the latest signature shared key and encryption shared key held in the apparatus B3 at present correspond to those transmitted from the apparatus A2. Here, the latest signature shared key and encryption shared key held in the apparatus B3 at present may be those obtained by decryption of the transfer data or may be those decrypted by the apparatus B3.

3. reads a value from the counter value buffer Cnt-BufCSRNG (352) and calculates pre_cnt←Cnt-BufCSRNG—2×(N—retry_index). That is, the counter value relative to the number of times of transfer indicated by retry_index is calculated as pre_cnt.

4. executes the following by using the cryptographical pseudo random number generating function of the pseudo random number generation processing unit 359:

tmp1:=Enc(KeyBufCSRNG, RandBufCSRNG∥pre_cnt)
K(j,1):=tmp1 EOR pre_cnt
pre_cnt←pre_cnt +1
tmp2:=Enc(KeyBufCSRNG, RandBufCSRNG∥pre_cnt)
K(j,2):=tmp2 EOR pre_cnt Then, the apparatus B3 stores K(j,l) in the session key buffer KeyBuf1 (304-1) and stores K(j,2) in the session key buffer KeyBuf2(305-1).

5. calculates r2:=PRF(ski,IDi∥tss(j)∥rc∥retry_index∥2×(j+1)) in the signature issuance verification processing unit 303.

6. executes sk_old:=ski and ski←KeyBuf2 within the buffer as the updating of the pre-shared key ski already registered in the nonvolatile memory 308, and executes sk_old registration and ski updating in the nonvolatile memory 308. Further, the pseudo random number generating exclusive key is also updated. That is, the apparatus B3 executes isk0_old←KeyBufCSRNG and KeyBufCSRNG←KeyBuf1 within the buffer and executes isk0_old registration updating and registration updating of a KeyBufCSRNG value in the nonvolatile memory 308.

7. summaries the calculation results obtained in the above into Data (j+5):=(IDi,tss (j), rc, r2, retry_index) and transmits (2×j+1, Data (j+5)) to the apparatus A2 to finish the processing. However, when the apparatus B3 receives a processing interruption notification from the apparatus A2, the apparatus B3 executes interruption processing to be described in the following (3-2).

Thus, the apparatus B3 transfers to the apparatus A2, the transfer data including the ordinal number (retry_index) indicating at what number of transfer in the N times transfers the latest signature shared key and encryption shared key included in the apparatus B3 correspond to the signature shared key and the encryption shared key transmitted from the apparatus A2.

Further, when the transfer of the transfer data including retry_index is performed, the pseudo random number generation processing unit 359 adopts the encryption shared key generated by the pseudo random number generation processing unit 359 using the counter value specified from retry_index as a new key for generating a cryptographical pseudo random number. Incidentally, the signature shared key generated by the pseudo random number generation processing unit 359 using the counter value specified from retry_index may be adopted as a new key.

(3-2) Verification of Re-execution Index and Verification of Pre-shared key Updating in Apparatus A2:

Upon receipt of (2×j+1, Data(j+5)=(IDi,tss(j),rc,r2,retry_index), the apparatus A2 executes the following (S801):

1. verifies whether IDi,tss(j),rc,r2,retry_index∈$\{0,1\}^{\wedge}k$, i.e., the lengths of their respective data are respectively defined as a predetermined value, and determines whether IDi is an ID registered as an ID of the apparatus B3. When they are not satisfied, the apparatus A2 assumes retry_index:=−1 and shifts processing to the following Step 3. When they are satisfied, the following operations are executed.

2. executes in the signature issuance verification processing unit 303 by using the pre-shared key ski already stored in the nonvolatile memory 308 whether or not r2==PRF(ski, IDi∥tss(j)∥rc∥retry_index∥2×(j+1)) is satisfied. When it is not satisfied, the apparatus A2 assumes retry_index:=−1.

3. confirms whether retry_index≠−1. When the result of its confirmation is not satisfied, the apparatus A2 executes interruption processing. When the confirmation result is satisfied, the following operations are executed.

4. confirms whether retry_index==N. When the result of its confirmation is satisfied, the apparatus A2 executes sk_old:=ski and ski:=KeyBuf2 within the buffer as the updating of the pre-shared key ski already registered in the nonvolatile memory 308. Here, sk_old registration and ski updating are executed in the nonvolatile memory 308. Further, the pseudo random number generating exclusive key is also updated. That is, the apparatus A2 executes isk0_old←KeyBufCSRNG, KeyBufCSRNG←KeyBuf1 within the buffer, and executes isk0_old registration updating and registration updating of a KeyBufCSRNG value in the nonvolatile memory 308. Then, the apparatus A2 finishes the processing. When the confirmation result is not satisfied, the following operations are executed.

5. reads a value from the counter value buffer Cnt-BufCSRNG (352) and calculates pre_cnt←Cnt-BufCSRNG—2×(N—retry_index).

6. executes the following by using the cryptographical pseudo random number generating function of the pseudo random number generation processing unit 359:

tmp1:=Enc(KeyBufCSRNG, RandBufCSRNG∥pre_cnt)
K(j,1):=tmp1 EOR pre_cnt
pre_cnt←pre_cnt+1
tmp2:=Enc(KeyBufCSRNG, RandBufCSRNG∥pre_cnt)
K(j,2):=tmp2 EOR pre_cnt Then, the apparatus A2 stores K(j,1) in the session key buffer KeyBuf1 (304-1) and stores K (j,2) in the session key buffer KeyBuf2 (305-1).

7. executes sk_old:=ski, and ski←KeyBuf2 within the buffer as the updating of the pre-shared key ski already registered in the nonvolatile memory 308, and executes sk_old registration and ski updating in the nonvolatile memory 308. Further, the pseudo random number generating exclusive key is also updated. That is, the apparatus A2 executes isk0_old←KeyBufCSRNG and KeyBufCSRNG←KeyBuf1 within the buffer and executes isk0_old registration updating and registration updating of a KeyBufCSRNG value in the nonvolatile memory 308.

Thus, when the transfer of the transfer data including retry_index is performed from the apparatus B3, the pseudo random number generation processing unit 359 adopts the encryption shared key generated by the pseudo random number generation processing unit 359 using the counter value specified from retry_index as a new key for generating a cryptographical pseudo random number. This therefore makes it possible to enhance safety. Incidentally, when the signature shared key generated by the pseudo random number generation processing unit 359 using the counter value specified from retry_index is adopted in the apparatus B3 as a new key for generating a cryptographical pseudo random number, the signature shared key is adopted as a new key even in the apparatus A2.

8. then re-executes the repetitive processing described in the above (2) in a range of j∈[retry_index+1,N].

Thus, the apparatus A2 executes again transfers of the number of times next and subsequent to an ordinal number transmitted from the apparatus B3 by using for the first transfer of retransfers, the signature shared key and the encryption shared key generated by the pseudo random number generation processing unit 359 using the counter value specified from the ordinal number. Consequently, the apparatus B3 is capable of receiving transfer data next and subsequent to the ordinal number again.

In the interruption processing at the apparatus A2, the apparatus A2 notifies processing interruption to the apparatus B3. This interruption notification is done in mutual authentication using ski prior to its updating. In particular, in the mutual authentication based on the present interruption notification, signature verification using ski and sk_old is executed and the identification of the pre-shared key is executed in the apparatus B3. When sk_old is identified as the pre-shared key, ski:=sk_old is executed as cancel processing and reflected on the nonvolatile memory 308 of the apparatus B3. The apparatus B3 issues a signature by using the identified pre-shared key and notifies the same to the apparatus A2. The apparatus A2 executes signature verification using ski before being updated. When this is passed, the identification of the pre-shared key between the apparatus A2 and the apparatus B3 is completed. When the identification of the pre-shared key is successful, the present protocol can be executed again from the beginning. With the completion of the interruption processing, the execution of the present protocol is interrupted.

Now, when the processing is normally completed in the apparatus A2, the keys K(j,1) and K(j,2) and msg(j) are not falsified by a main in the middle and leaked thereto, and are prevented from lacking, with respect to j assumed to be result(j)==001. In particular, K(j,1), K(j,2) and msg(j) are successfully stored in a key storage region of the apparatus B3. That can also said about until the time when N is indicated by retry_index even when the repetitive processing is re-executed because retry_index<N. In the case other than that, a failure factor analysis is possible with the value of result(j), which is stored in rc. When the value is 010, its processing is recorded as a write failure due to value lacking at writing. When the value is 100, its processing is recorded as a failure in signature verification processing before the data decryption. When the value is 110, its processing is recorded as a reception error (possibility of message falsification).

Particularly, when the repetitive processing is re-executed because retry_index<N, the pre-shared key is updated, and hence even if the pre-shared key before the repetition leaks, the key is not subjected to the fastest use upon re-execution and is safe.

The present protocol is fail safe because when any of values in the transfer message is falsified, the verification of the signatures in the apparatus B3 and the apparatus A2 issued from the apparatus A2 and the apparatus B3 is failed. Further, the signature r2 is issued in the apparatus A2, and hence it is not possible for an attacker to make verification in the apparatus A2 successful with the falsification of the value of rc or retry index. When all or any of the values in the transfer message is falsified, it is possible to detect the occurrence of some falsification.

Embodiment 4

Figure 9A:
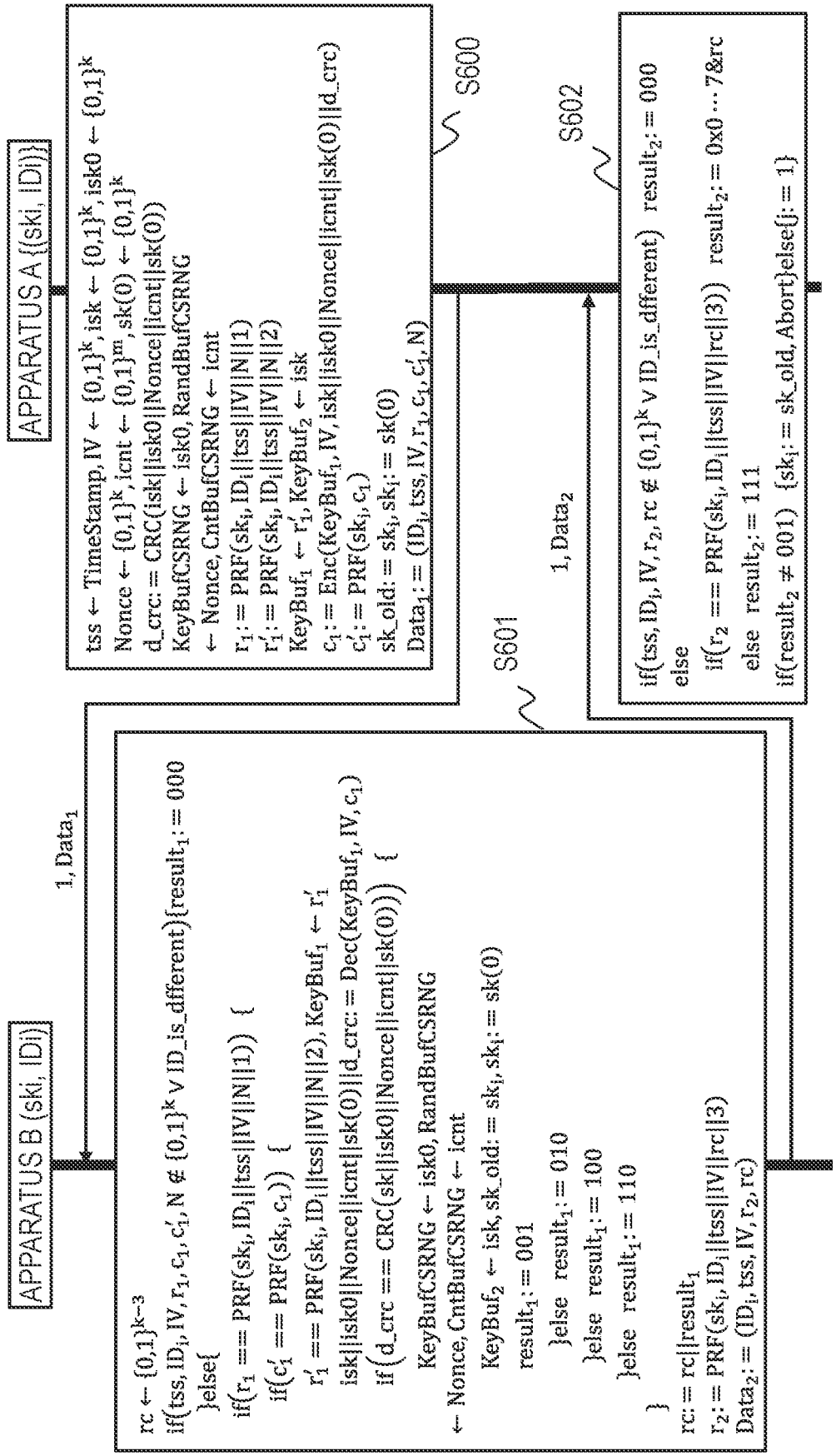
FIG. 9A is a diagram showing the flow of a transfer protocol according to the embodiment 3.

In the sequences shown in FIGS. 9A through 9E, the apparatus B3 generates the random number sk(j) as the new pre-shared key in the apparatus B3 in S701 (refer to FIG. 9C). That is, in the sequences shown in FIGS. 9A through 9E, the updating of the pre-shared key is executed without using the characteristic of being reproducibility of the cryptographical pseudo random number in the repetitive processing. In the present embodiment, the sequences are made more efficient by using the characteristic. The sequences in which such efficiency is performed on the sequences shown in FIGS. 9A through 9E are illustrated in FIGS. 10A and 10B. Incidentally, FIG. 10A shows the sequence obtained by correcting the sequence shown in FIG. 9C. FIG. 10B shows the sequence obtained by correcting the sequence shown in FIG. 9D. Therefore, the sequences according to the embodiment 4 are comprised of FIG. 9A, FIG. 9B, FIG. 10A, FIG. 10B, and FIG. 9E.

Description similar to that of the embodiment 3 will be made below while being omitted as appropriate.

<(1) Mutual Authentication Accompanied with Number of Times of Transfers>

Since the same operation as that shown in FIG. 9A is performed, illustrations and their description will be omitted.

After completion of the sequence of the above (1), N times transfers are performed in the following manner.

Figure 9B:
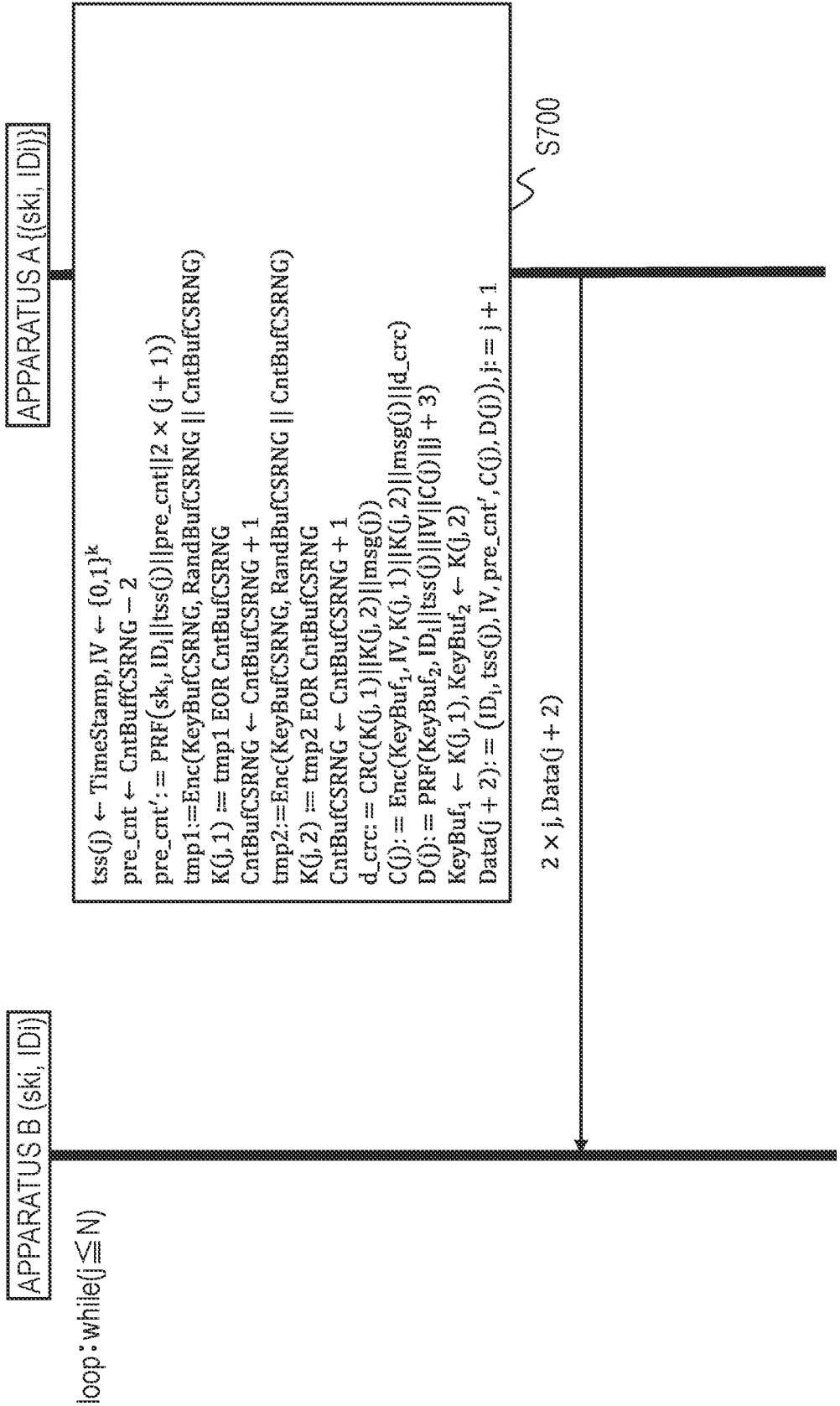
FIG. 9B is a diagram showing the flow of a transfer protocol according to the embodiment 3.
Figure 10A:
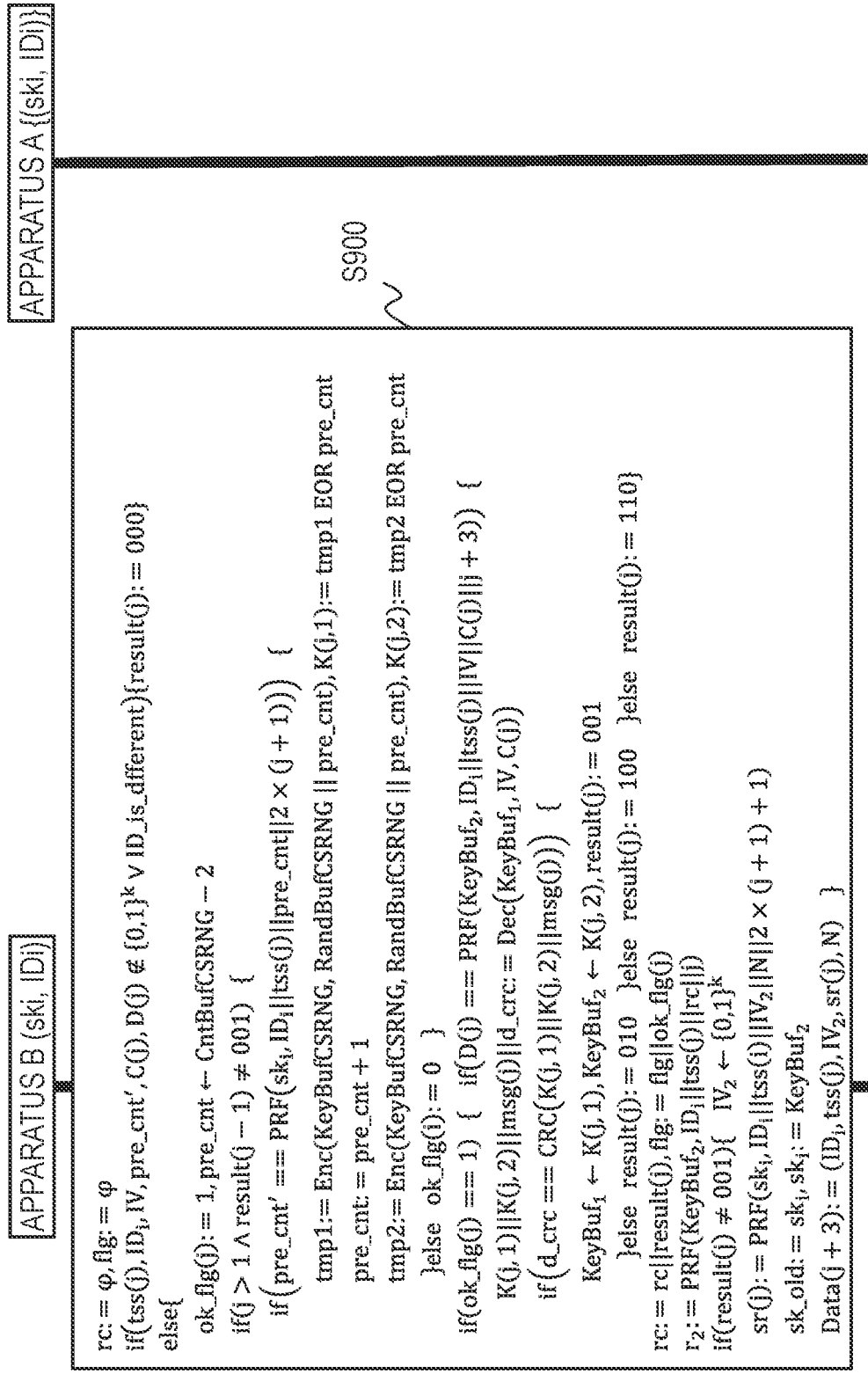
FIG. 10A is a diagram showing the flow of a transfer protocol according to an embodiment 4.
Figure 10B:
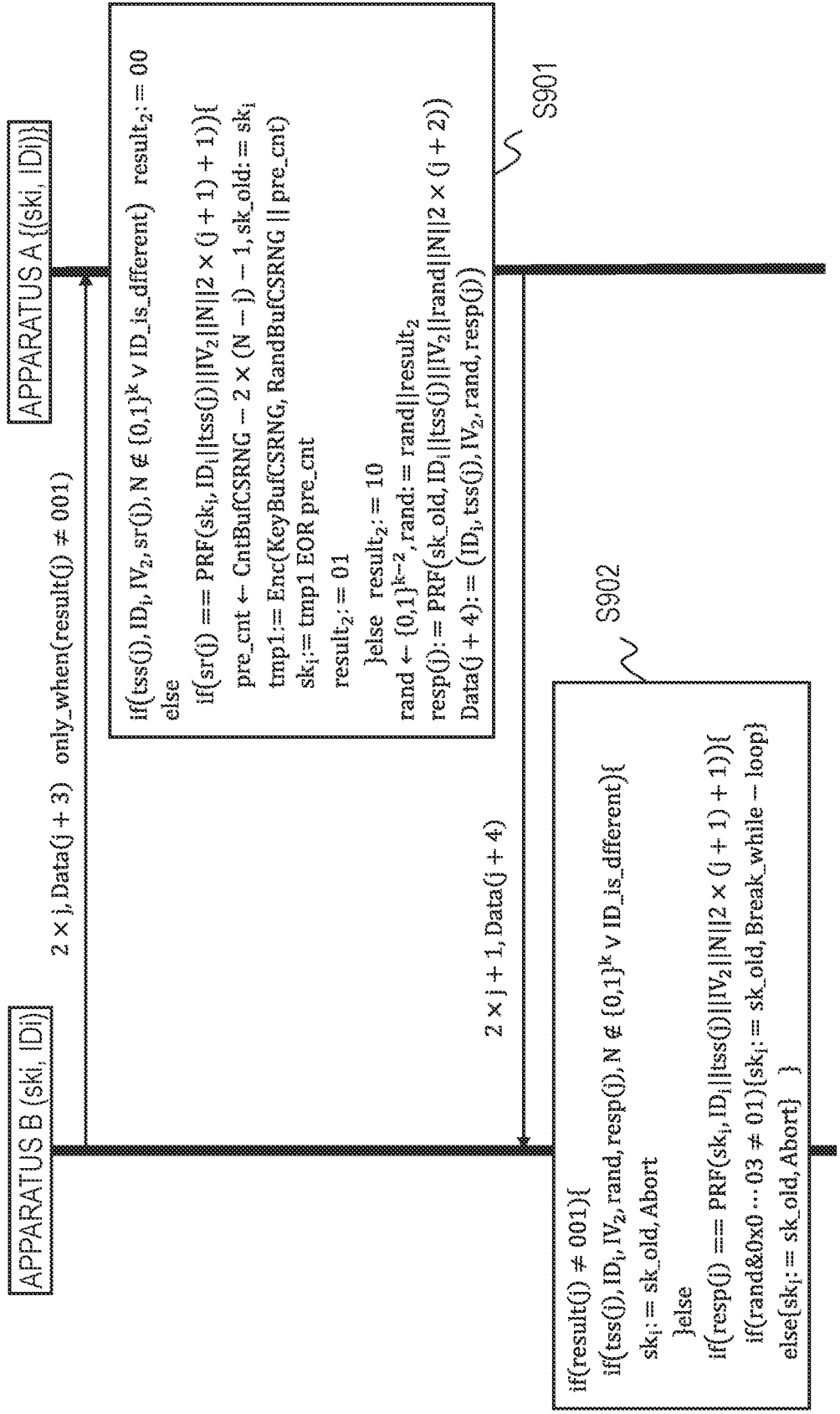
FIG. 10B is a diagram showing the flow of a transfer protocol according to the embodiment 4.

<(2) Transfers of updated key and message in plural times> (refer to FIG. 9B, FIG. 10A, and FIG. 10B)

(2-1) Construction of Apparatus Authentication Information in Apparatus A2:

Since the same operation as that shown in FIG. 9B is performed, illustrations and their description are omitted.

(2-2) Data Decryption and Data Storage in Apparatus B3: (refer to FIG. 10A)

When the apparatus B3 receives a message from the apparatus A2 and its index is an even number, the apparatus B3 executes the following after the completion of the present processing (S900).

1. configures empty sets rc and flg as variables.

2. verifies whether tss (j), IDi, IV, pre_cnt',C (j), D(j) ∈{0,1}^k, i.e., the lengths of their respective data are respectively defined as a predetermined value, and determines whether IDi coincides with its own one. When they are not satisfied, the apparatus B3 assumes result (j):=000 and shifts processing to the following Step 12. When they are satisfied, the following operations are executed.

3. assumes ok_flg (j):=1, reads a value from the counter value buffer CntBufCSRNG(352), and executes pre_cnt←CntBufCSRNG—2.

4. confirms whether j>1 and result (j−1)≠001, i.e., key updating is failed in the previous processing. When it fails, the apparatus B3 executes the following. That is, the apparatus B3 generates a key which should have been acquired upon the previous transfer. When it succeeds, the apparatus B3 shifts processing to the following Step 7.

5. confirms whether pre_cnt'==PRF(ski,IDi∥tss(j)∥pre_cnt∥2×(j+1)). When the result of its confirmation is satisfied, the apparatus B3 executes the following. When the confirmation result is not satisfied, the apparatus B3 assumes ok_flg(j):=0, and shifts the processing to the following Step 12. In the present Step 5, the apparatus B3 verifies the signature of each counter value to thereby confirm whether the counter value managed by the apparatus A2 and the counter value managed by the apparatus B3 are synchronized.

6. executes the following using the cryptographical pseudo random number generating function of the pseudo random number generation processing unit 359 to generate an encryption/decryption key (K(j,1)) and a signature issuance/verification key (K(j,2)).

tmp1:=Enc(KeyBufCSRNG, RandBufCSRNG∥pre_cnt)
K(j,1):=tmp1 EOR pre_cnt
pre_cnt←pre_cnt+1
tmp2:=Enc(KeyBufCSRNG, RandBufCSRNG∥pre_cnt)
K(j,2):=tmp2 EOR pre_cnt Then, the apparatus B3 stores K(j,1) in the session key buffer KeyBuf(304-1) and stores K(j,2) in the session key buffer KeyBuf2(305-1).

7. confirms whether ok_flg(j)==1. When the result of its confirmation is satisfied, the apparatus B3 executes the following. That is, when the apparatus B3 has a key necessary for the verification of a signature of data transferred this time and a key necessary for decryption, the apparatus B3 executes the following. When the confirmation result is not satisfied, the apparatus B3 assumes result(j):=110 and shifts the processing to the following Step 12.

8. reads a key value from the session key buffer KeyBuf2 (305-1) and verifies in the signature issuance verification processing unit 303 whether D (j)=PRF (KeyBuf2, IDi∥tss (j)∥IV∥C(j)∥j+3). When the result of its verification is not satisfied, the apparatus B3 assumes result(j):=100. When the verification result is satisfied, the apparatus B3 executes the following processing.

9. reads a key value from the session key buffer KeyBuf1 (304-1), executes K (j,1)∥K (j,2)∥msg (j)∥d_crc:=Dec (KeyBuf1, IV, C (j)) in the encryption/decryption processing unit 302, and executes the following Step 10 and subsequently.

10. calculates a CRC of K (j,1)∥K (j,2)∥msg(j) obtained by decryption as CRC (K (j,1)∥K (j,2)∥msg (j) in the error code processing unit 319 and verifies whether it coincides with d_crc. When they do not coincide with each other, the apparatus B3 assumes result(j):=010. When the result of its verification is satisfied, the following operations are executed.

11. stores K(j,1) obtained as the decryption result in the session key buffer 304-2, and stores K (j,2) in the buffer 305-2. The apparatus B3 flips the two session key alternation buffers. That is, the buffer 304-2 is replaced with KeyBuf1 (304-1), and the buffer 304-1 is replaced with the buffer 304-2. Further, the buffer 305-2 is replaced with KeyBuf2 (305-1), and the buffer 305-1 is replaced with the buffer 305-2. The apparatus B3 assumes result(j):=001.

12. assumes rc:=rc∥result (j) and adds result(j) to the set rc. The apparatus B3 assumes flg:=flg∥ok_flg (j) and adds ok_flg (j) to the set flg.

13. confirms whether result (j)≠001. When the result of its confirmation is satisfied, the apparatus B3 executes the following Step 14 and subsequently. That is, when the apparatus B3 fails in acquiring the proper transfer data, the apparatus B3 defines the value of KeyBuf2 a new pre-shared key (sk (j)) as indicated in Step 14 and subsequently. When the confirmation result is not satisfied, the apparatus B3 continues repetitive processing. When j=N is established, the apparatus B3 finishes the repetitive processing.

14. generates a random number in the pseudo random number generation processing unit 359 and assumes the same to be IV2←{0,1}^k. The apparatus B3 calculates sr(j):=PRF (ski, IDi∥tss (j)∥IV2∥N∥2×(j+1)+1) in the signature issuance verification processing unit 303 and stores the same in the issued signature buffer 307.

15. in order to update the pre-shared key ski already registered in the nonvolatile memory 308, executes sk_old:=ski, and ski:=KeyBuf2 within the buffer and executes sk_old registration and ski updating in the nonvolatile memory 308.

16. summaries the calculation results obtained in the above into Data (j+3):=(IDi,tss (j), IV2, sr (j)) and transmits (2×j, Data (j+3)) to the apparatus A2.

(2-3) Updating of Pre-shared key in Apparatus A2: (refer to FIG. 10B)

When the apparatus A2 receives a response from the apparatus B3 and its index is an even number, the apparatus A2 executes the following after the completion of the present processing (S901).

1. verifies whether tss(j),IDi,IV2,sr(j),N∈{0,1}^k, i.e., the lengths of their respective data are respectively defined as a predetermined value, and determines whether IDi coincides with an ID of the apparatus B3. When they are not satisfied, the apparatus A2 assumes result2:=00 and shifts processing to the following Step 6. When they are satisfied, the following operations are executed.

2. confirms whether sr(j)==PRF(ski,IDi∥tss(j)∥IV2 ∥N∥2×(j+1)+1) in the signature issuance verification processing unit 303. When the result of its confirmation is satisfied, the apparatus A2 executes the following operations. When the confirmation result is not satisfied, the apparatus A2 assumes result2:=10 and shifts the processing to the following Step 6.

3. reads a value from the counter value buffer CntBufCSRNG (352) and calculates pre_cnt←CntBufCSRNG—2×(N-j)—1.

4. executes the following using the cryptographical pseudo random number generating function of the pseudo random number generation processing unit 359:

tmp1:=Enc(KeyBufCSRNG, RandBufCSRNG∥pre_cnt)
ski:=tmp1 EOR pre_cnt

Then, the apparatus A2 stores K (j , 2) into the session key buffer KeyBuf2(305-1).

5. executes sk_old:=ski, and ski←KeyBuf2 within the buffer to update the pre-shared key ski already registered in the nonvolatile memory 308 because the signature verification is already in success, and executes sk_old registration and ski updating in the nonvolatile memory 308. Further, the apparatus A2 assumes result2:=01.

6. generates random numbers in the pseudo random number generation processing unit 359 and assumes the same to be rand←{0,1}^(k-2). Further, the apparatus A2 assumes result2:32 rand∥result2.

7. calculates resp(j):=PRF(sk_old,IDi∥tss(j)∥IV2∥rand∥N∥2×(j+2)) in the signature issuance verification processing unit 303.

8. summaries the calculation results obtained in the above into Data(j+4):=(IDi,tss(j),IV2,rand,resp(j)) and transmits (2×j+1, Data(j+4)) to the apparatus B3.

As described above, when the apparatus B3 fails in the acquisition of the proper transfer data in the j−1th transfer (when fails in the acquisition (synchronization) of the signature shared key and the encryption shared key transmitted in the j−1th transfer from the apparatus A2), the apparatus B3 adopts the latest signature shared key obtained from the apparatus A2 by the apparatus B3 as a new pre-shared key and notifies the apparatus A2 that the apparatus B3 has failed in obtaining the signature shared key and the encryption shared key transmitted in the j−1th transfer (S900). Then, the apparatus A2 having received the notification therein generates the new pre-shared key adopted by the apparatus B3 from the pseudo random number generation processing unit 359 by using the counter value specified from the ordinal number j. Therefore, the processing of generating the new pre-shared key using the random number in the apparatus B3 as illustrated in the embodiment 3 can be omitted, and the more efficient sequence is provided. Incidentally, the encryption shared key other than the signature shared key may be adopted as the new pre-shared key.

(2-4) Confirmation of Synchronization with Apparatus A2 in Apparatus B3 in terms of Updating of Pre-shared key: (refer to S902 of FIG. 10B)

Figure 9D:
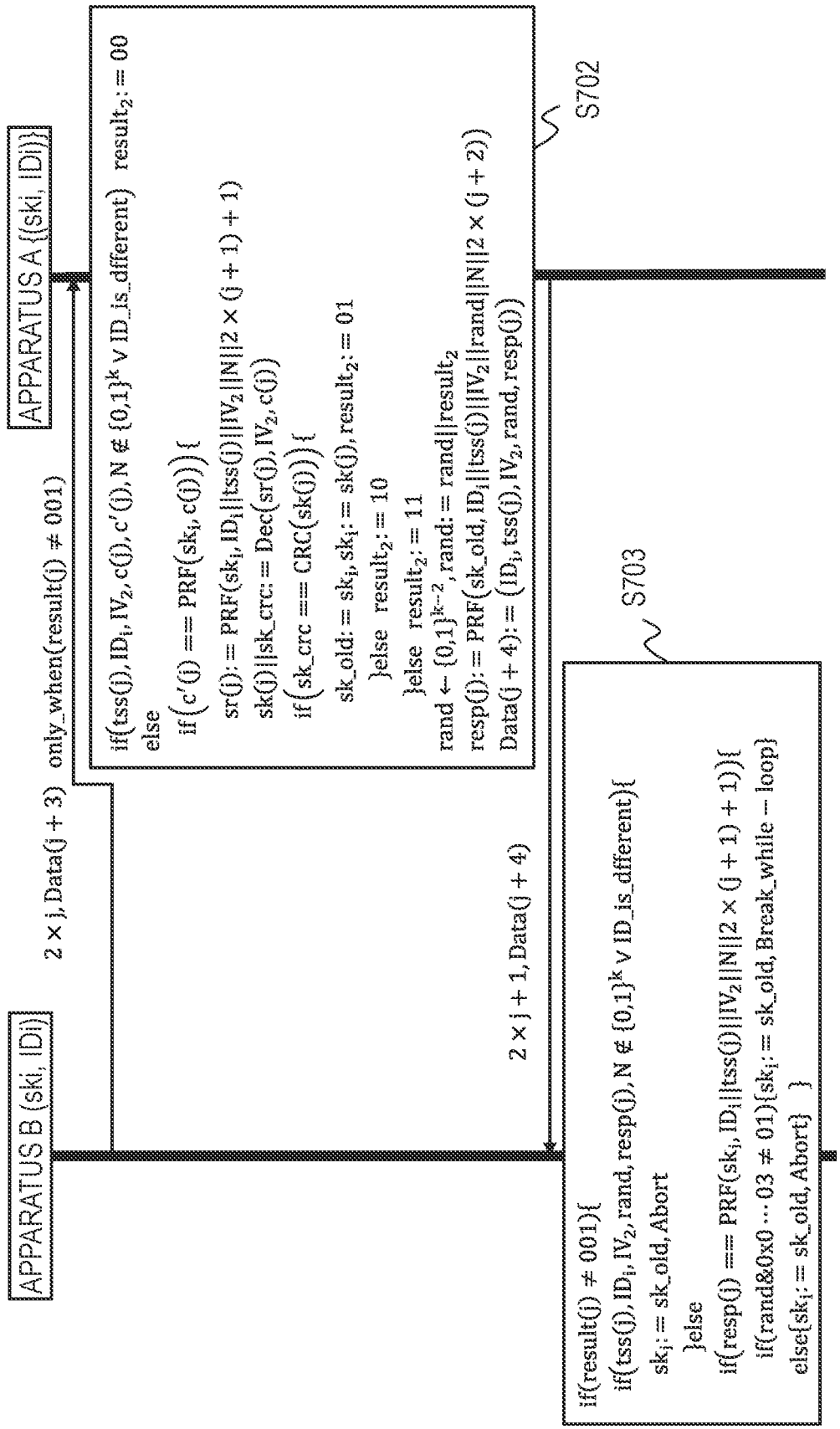
FIG. 9D is a diagram showing the flow of a transfer protocol according to the embodiment 3.

Since the same operation as that of the apparatus B3 shown in FIG. 9D is performed, illustrations and their description are omitted.

<(3) Updating and Synchronization of Pre-Shared Key Accompanied with Mutual Authentication and Identification of Re-execution Index>

Figure 9E:
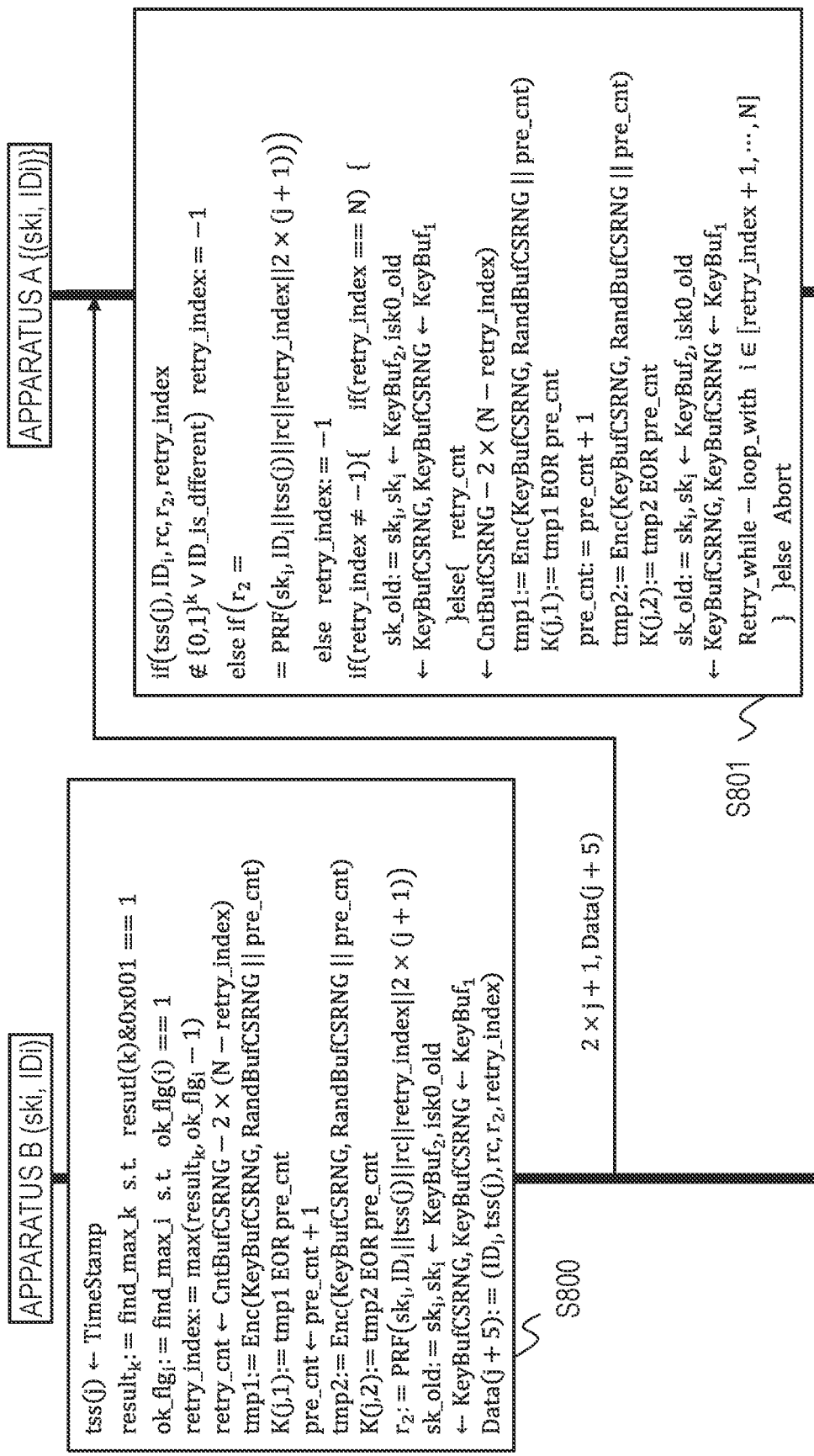
FIG. 9E is a diagram showing the flow of a transfer protocol according to the embodiment 3.

Since the same operation as that shown in FIG. 9E is performed, illustrations and their description are omitted.

Although the invention made above by the present inventors has been described specifically on the basis of the preferred embodiments, the present invention is not limited to the embodiments referred to above. It is needless to say that various changes can be made thereto within the scope not departing from the gist thereof. For example, the following security protocol can be configured as a natural extension of the embodiment 3. That is, a security protocol can be configured which includes a data transfer sequence capable of data division transfer and of data error detection or correction and having falsification resistance and forward secrecy, and which is capable of re-transmission execution upon the occurrence of a message loss regardless of the existence of forward secrecy. Further, in the re-transmission execution at the occurrence of the message loss in the security protocol, it is possible not only to realize a re-transmission system from where key updating is failed, but also to realize the following system. That is, there can also be configured a security protocol in which even when some problem occurs during execution of key updating corresponding to a specified number of times of transfers, and the key updating is failed, a key value having failed to be received can be prepared by an apparatus on the reception side when additional authentication is passed. By doing so, there can be realized a system which performs re-transmission from where the additional authentication is failed, while realizing the latest data transfer as much as possible in the form accompanied with the falsification resistance and forward secrecy.

Figure 11:
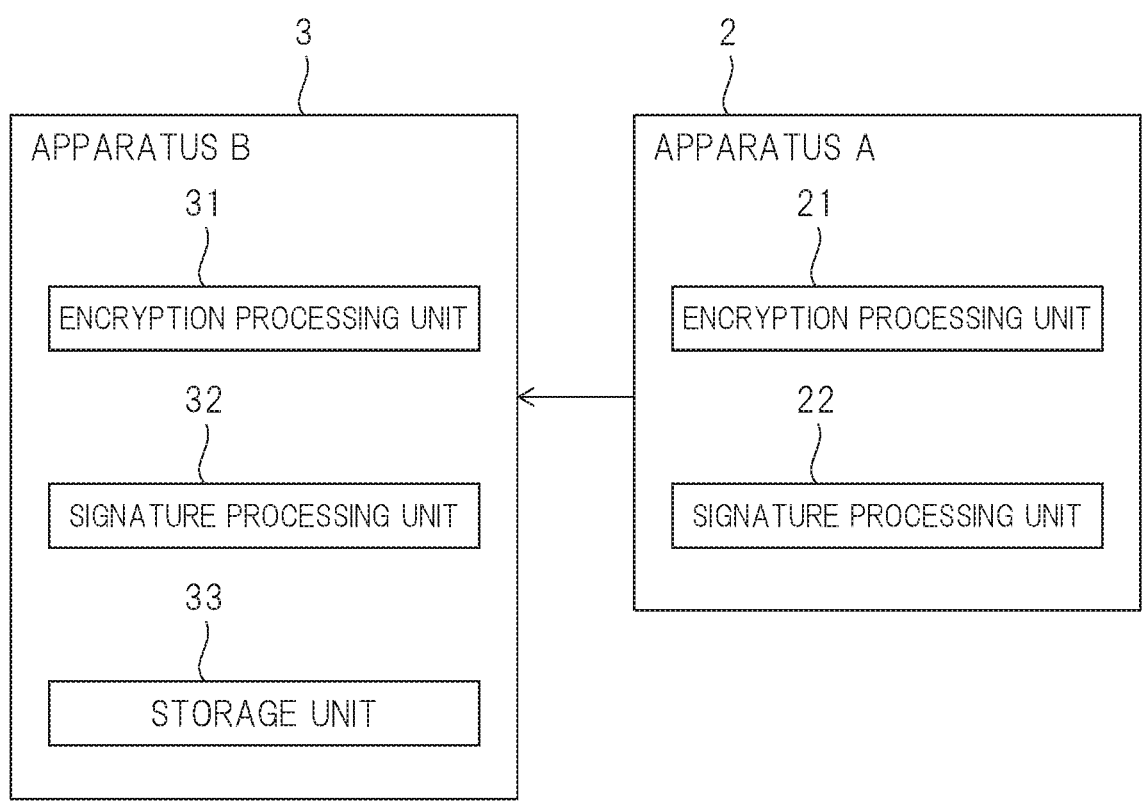
FIG. 11 is a block diagram showing one example of a configuration of a simplified embodiment.

Further, it is also possible to consider an embodiment simplified in the following manner. FIG. 11 is a block diagram showing one example of the configuration of the simplified embodiment. As illustrated in FIG. 11, a data transfer system 1 includes an apparatus A2 and an apparatus B3. Here, the apparatus A2 has an encryption processing unit 21 and a signature processing unit 22. The apparatus B3 has an encryption processing unit 31, a signature processing unit 32, and a storage unit 33 for storing a shared key decrypted by the encryption processing unit 31. Incidentally, the storage unit 33 may be a buffer memory (volatile memory) or may be a nonvolatile memory. The apparatus A2 encrypts a new shared key by the encryption processing unit 21, issues a signature for the encrypted new shared key by the signature processing unit 22, and transmits the signature and the encrypted new shared key to the apparatus B3. Then, when the signature processing unit 32 fails in verifying the signature, the apparatus B3 performs control to prohibit at least one of processing executed after the reception of the encrypted new shared key and required to store a new shared key into the storage unit 33. According to such a configuration, since it is possible to prevent registration of a new shared key in the apparatus B3 when the signature verification is not passed, the security of key updating can be enhanced as compared with the case that the present configuration is not prepared.

What is claimed is:

1. A data transfer system comprising:
   a first apparatus having a first encryption processing unit, a first signature processing unit, and a first storage unit configured to store a shared key decrypted by the first encryption processing unit; and
   a second apparatus having a second encryption processing unit and a second signature processing unit,
   wherein the second apparatus encrypts a new shared key by the second encryption processing unit, issues a signature for the encrypted new shared key from the second signature processing unit, and transmits the signature and the encrypted new shared key to the first apparatus,
   wherein when the first signature processing unit fails in verifying the signature, the first apparatus performs control to prohibit at least one of processing executed after reception of the encrypted new shared key and required to store the new shared key into the first storage unit,
   wherein when a transfer to the first apparatus is continuously performed N times (where N is an integer of 2 or more), the second apparatus processes and transfers transfer data including a jth signature shared key and encryption shared key used for a jth transfer by using a j−1th signature shared key and encryption shared key in a j−1th transfer (where j is an integer of 2 or more and N or less),
   wherein the first apparatus transfers to the second apparatus, transfer data including the number of times of consecutive success of transfers counted from a first transfer of the transfer data, and the latest signature shared key and encryption shared key which are encrypted by the second encryption processing unit using a pre-shared key shared in advance between the first apparatus and the second apparatus and which are obtained from the second apparatus by the first apparatus, and
   wherein the second apparatus decrypts the transfer data transferred from the first apparatus by using the pre-shared key, and executes again transfers of the number of times next and subsequent to the number of times of the consecutive success of the transfers by using for the first transfer of retransfers, the signature shared key and the encryption shared key obtained by the decryption.

2. The data transfer system according to claim 1, wherein when the first signature processing unit fails in verifying the signature, the first apparatus performs control to prohibit decryption of the encrypted new shared key by the first encryption processing unit.

3. The data transfer system according to claim 1,
wherein the first storage unit includes a nonvolatile memory that stores the shared key and a buffer memory that temporarily stores the shared key, and
wherein when the first signature processing unit fails in verifying the signature, the first apparatus performs control to prohibit storage of the new shared key decrypted by the first encryption processing unit into the buffer memory.

4. The data transfer system according to claim 1,
wherein the first storage unit includes a nonvolatile memory that stores the shared key and a buffer memory that temporarily stores the shared key, and
wherein when the first signature processing unit fails in verifying the signature, the first apparatus performs control to prohibit storage of the new shared key decrypted by the first encryption processing unit and stored in the buffer memory into the nonvolatile memory.

5. The data transfer system according to claim 1,
wherein the first storage unit includes a first buffer memory temporarily storing a shared key therein,
wherein the second apparatus has a second storage unit including a second buffer memory temporarily storing a shared key therein, and
wherein the first buffer memory and the second buffer memory respectively include a first surface and a second surface, one of which stores a shared key used for a current transfer, and the other of which stores a new shared key used for a next transfer.

6. The data transfer system according to claim 1, wherein the transfer data including the number of times of the consecutive success, and the signature shared key and the encryption shared key is transferred, the first apparatus and the second apparatus adopt the signature shared key or the encryption shared key as a new pre-shared key.

7. A data transfer system comprising:
a first apparatus having a first encryption processing unit, a first signature processing unit, and a first storage unit configured to store a shared key decrypted by the first encryption processing unit; and
a second apparatus having a second encryption processing unit and a second signature processing unit,
wherein the second apparatus encrypts a new shared key by the second encryption processing unit, issues a signature for the encrypted new shared key from the second signature processing unit, and transmits the signature and the encrypted new shared key to the first apparatus,
wherein when the first signature processing unit fails in verifying the signature, the first apparatus performs control to prohibit at least one of processing executed after reception of the encrypted new shared key and required to store the new shared key into the first storage unit,
wherein the first apparatus further includes a first pseudo random number generating unit which generates a cryptographical pseudo random number uniquely determined by a predetermined key, a predetermined random number, and an arbitrary counter value,
wherein the second apparatus further includes a second pseudo random number generating unit which generates a cryptographical pseudo random number uniquely determined by the predetermined key, the predetermined random number, and an arbitrary counter value,
wherein the counter values used in the first pseudo random number generating unit and the second pseudo random number generating unit are values respectively changed by a predetermined value for each transfer,
wherein when a transfer to the first apparatus is continuously performed N times (where N is an integer of 2 or more), the second apparatus processes and transfers transfer data including a jth signature shared key and encryption shared key used for a jth transfer by using a j−1th signature shared key and encryption shared key in a j−1th transfer (where j is an integer of 2 or more and N or less),
wherein the jth signature shared key and encryption shared key are cryptographical pseudo random numbers generated by the first pseudo random number generating unit, and
wherein when the first apparatus fails in obtaining the signature shared key and the encryption shared key transmitted in the j−1th transfer from the second apparatus, the first apparatus generates the signature shared key and the encryption shared key used for the jth transfer from the first pseudo random number generating unit.

8. The data transfer system according to claim 7,
wherein upon each transfer, the second apparatus transmits to the first apparatus, a signature for the counter value managed by the second apparatus as well, which is generated by the second signature processing unit by using a pre-shared key shared in advance between the first apparatus and the second apparatus, and
wherein when the signature shared key and the encryption shared key used for the jth transfer are generated by the first pseudo random number generating unit, the first apparatus generates the signature shared key and the encryption shared key used for the jth transfer from the first pseudo random number generating unit where the signature transmitted from the second apparatus passes verification by the first signature processing unit using the counter value managed by the second apparatus and the pre-shared key.

9. The data transfer system according to claim 8,
wherein when the first apparatus fails in obtaining the signature shared key and the encryption shared key transmitted in the j- lth transfer from the second apparatus, the first apparatus generates a new pre-shared key and transfers the same to the second apparatus, and
wherein the first and second apparatuses update the pre-shared key at present by the new pre-shared key.

10. The data transfer system according to claim 8,
wherein when the first apparatus fails in obtaining the signature shared key and the encryption shared key transmitted in the j−1th transfer from the second apparatus, the first apparatus adopts the latest signature shared key or encryption shared key obtained by the first apparatus from the second apparatus as a new pre-shared key, and notifies the second apparatus that the first apparatus has failed in obtaining the signature shared key and the encryption shared key transmitted in the j−1th transfer, and
wherein the second apparatus having received the notification therein generates the new pre-shared key adopted by the first apparatus from the second pseudo random number generating unit by using the counter value specified from the ordinal number j.

11. The data transfer system according to claim 7,
wherein the first apparatus transfers to the second apparatus, transfer data including an ordinal number indicative of whether the latest signature shared key and encryption shared key held in the first apparatus correspond to a signature shared key and an encryption shared key transmitted from the second apparatus in a what-numbered transfer of the transfers of N times, and wherein the second apparatus executes the next and subsequent transfers of the ordinal number again by using in the first transfer of the retransfers, the signature shared key and the encryption shared key generated by the second pseudo random number generating unit using the counter value specified from the ordinal number.

12. The data transfer system according to claim 11, wherein when the transfer data including the ordinal number is transferred, each of the first pseudo random number generating unit and the second pseudo random number generating unit of the second apparatus adopts as a new predetermined key, the signature shared key or the encryption shared key generated by each of the first pseudo random number generating unit and the second pseudo random number generating unit by using the counter value specified from the ordinal number.

* * * * *